(12) United States Patent
Fujiwara et al.

(10) Patent No.: US 7,133,524 B2
(45) Date of Patent: Nov. 7, 2006

(54) KEY INSTALLATION SYSTEM, LSI FOR IMPLEMENTING THE SAME, AND KEY INSTALLATION METHOD

(75) Inventors: Makoto Fujiwara, Kyoto (JP); Yusuke Nemoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 845 days.

(21) Appl. No.: 10/246,749

(22) Filed: Sep. 19, 2002

(65) Prior Publication Data

US 2003/0074571 A1    Apr. 17, 2003

(30) Foreign Application Priority Data

Sep. 20, 2001   (JP)   .............................. 2001-286881

(51) Int. Cl.
*H04L 9/00*    (2006.01)
*H03B 29/00*   (2006.01)
*G06F 7/58*    (2006.01)

(52) U.S. Cl. ............................ 380/45; 331/78; 380/44; 708/250; 713/191

(58) Field of Classification Search ..................... None
See application file for complete search history.

(56) References Cited

U.S. PATENT DOCUMENTS

| | | | |
|---|---|---|---|
| 4,238,853 A * | 12/1980 | Ehrsam et al. ................. 380/45 |
| 4,408,203 A * | 10/1983 | Campbell ..................... 705/71 |
| 4,683,968 A * | 8/1987 | Appelbaum et al. .......... 705/59 |
| 4,918,728 A * | 4/1990 | Matyas et al. ............... 380/280 |
| 4,924,515 A * | 5/1990 | Matyas et al. ............... 380/280 |
| 4,941,176 A * | 7/1990 | Matyas et al. ............... 380/280 |
| 5,142,578 A * | 8/1992 | Matyas et al. ............... 380/280 |
| 5,796,839 A * | 8/1998 | Ishiguro ....................... 380/44 |
| 6,510,519 B1 * | 1/2003 | Wasilewski et al. ......... 713/168 |
| 6,704,871 B1 * | 3/2004 | Kaplan et al. .............. 713/192 |
| 6,993,137 B1 * | 1/2006 | Fransdonk ................... 380/279 |

* cited by examiner

*Primary Examiner*—Kambiz Zand
*Assistant Examiner*—Virgil Herring
(74) *Attorney, Agent, or Firm*—McDermott Will & Emery LLP

(57) ABSTRACT

In the key installation system for improving the confidentiality and concealment of the key, a first decrypting circuit decrypts an encrypted key EKEY1(EDK(MK1)) using an encrypted key EDK1(MK1) as the key. A second decrypting circuit decrypts an encrypted key EMK1(KEY1) using the output of the second decrypting circuit, that is, an internal key KEY1 as the key. A third decrypting circuit decrypts the encrypted key EDK1(MK1) using the output of the second decrypting circuit, that is, an internal key MK1 as the key, to generate a final secret key DK1.

22 Claims, 20 Drawing Sheets

KEY INSTALLATION SYSTEM, LSI FOR IMPLEMENTING THE SAME, AND KEY INSTALLATION METHOD

BACKGROUND OF THE INVENTION

The present invention relates to a technology related to systems in which a key has been installed and LSIs used for such systems.

In conventional key installation systems, in general, a raw key with a fixed value is installed in an LSI.

In a general CMOS LSI, it is difficult to install a key unique to the individual LSI. Because, key is implemented in General CMOS LSIs by hard-wired logic or ROM. So, key is not able to change. A key may be loaded from an external ROM. In this case, however, the key may be analyzed inside a system (set). Also, a person other than the key administrator, such as an LSI designer and a system (set) designer, may possibly come to know the key. In addition, it is difficult to write keys with different values by mass-production technology. Moreover, there is no way to verify whether or not the key has been installed correctly. That is, testing of internal keys is difficult.

SUMMARY OF THE INVENTION

An object of the present invention is providing a key installation system improved in key confidentiality and concealment.

Another object of the present invention is providing an LSI enabling easy installation of various secret keys.

Yet another object of the present invention is providing a key installation system allowing testing of an installed value without increase of the circuit scale.

More specifically, the present invention is directed to a key installation system including a storage section and an LSI, wherein the storage section stores: a first encrypted key obtained by encrypting a final secret key using a first internal key; and a second encrypted key obtained by encrypting a second internal key using the first encrypted key, and the LSI stores a third encrypted key obtained by encrypting the first internal key using the second internal key, and receives the first and second encrypted keys from the storage section, the LSI including: a first decrypting circuit for decrypting the input second encrypted key using the input first encrypted key as the key; a second decrypting circuit for decrypting the third encrypted key using the output of the first decrypting circuit as the key; and a third decrypting circuit for decrypting the input first encrypted key using the output of the second decrypting circuit as the key.

According to the present invention, in the LSI, the first decrypting circuit decrypts the second encrypted key stored in the storage section using the first encrypted key stored in the storage section as the key, to generate the second internal key. The second decrypting circuit decrypts the third encrypted key stored in the LSI using the output of the first decrypting circuit, that is, the second internal key as the key, to generate the first internal key. The third decrypting circuit decrypts the first encrypted key using the output of the second decrypting circuit, that is, the first internal key, to generate the final secret key. That is to say, all the keys installed in the storage section and the LSI are encrypted keys, and the final secret key is generated in the LSI. This makes analysis of the keys difficult, and thus improves the confidentiality. In addition, the developers and installers of the LSI and the system can work on their development and installment without being provided with the raw secret key.

In the key installation system of the present invention, preferably, the LSI further stores a fourth encrypted key obtained by encrypting a first test internal key using a second test internal key, the LSI further including: a first selector receiving the third and fourth encrypted keys as the inputs for selecting and outputting either one of the inputs according to a first test signal; and a second selector receiving the output of the first selector and the output of the second decrypting circuit as the inputs for selecting and outputting either one of the inputs according to a second test signal, the second decrypting circuit receives the output of the first selector as the input in place of the third encrypted key, and the third decrypting circuit receives the output of the second selector as the key in place of the output of the second decrypting circuit.

With the above configuration, first, the first and second test signals are set so that the first selector selects the fourth encrypted key and the second selector selects the output of the second decrypting circuit. In this state, a development encrypted key obtained by encrypting a test final secret key using the first test internal key as the key is supplied to the first decrypting circuit as the key. Also, an encrypted key obtained by encrypting the second test internal key using the development encrypted key as the key is supplied to the first decrypting circuit as the object to be decrypted. As a result, the second test internal is key is output from the first decrypting circuit, and then the first test internal key is output from the second decrypting circuit. By supplying the development encrypted key as the object to be decrypted, the third decrypting circuit generates the test final secret key. In this way, whether or not the first, second and third decrypting circuits operate normally can be tested without the necessity of generating the actual final secret key.

Also, the first and second test signals are set so that the first selector selects the third encrypted key and the second selector selects the output of the first selector, that is, the third encrypted key. In this state, an encrypted key obtained by encrypting the test final secret key using the third encrypted key as the key is supplied to the third decrypting circuit as the object to be decrypted. The third decrypting circuit decrypts the supplied encrypted key using the third encrypted key as the key, to thereby generate the test final secret key. In this way, whether or not the third decrypted key has been installed correctly can be tested without the necessity of generating the actual final secret key.

Alternatively, the present invention is directed to a key installation system including a storage section and an LSI, wherein the storage section stores: a first encrypted key obtained by encrypting a final secret key using an internal key; and a second encrypted key obtained by encrypting the internal key using a converted key obtained by conversion with a one-way function, and the LSI receives the first and second encrypted keys, the LSI including: a seed generator for generating a conversion seed as the source of generation of the converted key; a one-way function circuit for converting the conversion seed output from the seed generator with the one-way function using the input first encrypted key, to generate the converted key; a first decrypting circuit for decrypting the input second encrypted key using the output of the one-way function circuit as the key; and a second decrypting circuit for decrypting the input first encrypted key using the output of the first decrypting circuit as the key.

According to the present invention, in the LSI, the one-way function circuit converts the conversion seed generated by the seed generator using the first encrypted key, to generate the converted key. The first decrypting circuit decrypts the second encrypted key using the converted key as the key, to generate the internal key. The second decrypting circuit decrypts the first encrypted key using the internal key as the key, to generate the final secret key. When the internal key is changed to a different value, a new first encrypted key is generated, which generates a new converted key with a one-way function using the same conversion seed, and further generates a new second encrypted key. In other words, the internal key and the first and second encrypted keys can be arbitrarily set without changing the conversion seed. Thus, a key for encryption can be set individually for each system using a common LSI.

According to another aspect, the present invention is directed to an LSI for implementing a key installation system, configured to be able to generate a final secret key when the LSI receives a first encrypted key obtained by encrypting the final secret key using a first internal key as a first input and a second encrypted key obtained by encrypting a second internal key using the first encrypted key as a second input, the LSI including: a storage for storing a third encrypted key obtained by encrypting the first internal key using the second internal key; a first decrypting circuit for decrypting the second input using the first input as the key; a second decrypting circuit for decrypting the third encrypted key using the output of the first decrypting circuit as the key; and a third decrypting circuit for decrypting the first input using the output of the second decrypting circuit as the key.

According to yet another aspect, the present invention is directed to a method for installing a key in a system, including the steps of: storing a first encrypted key obtained by encrypting a final secret key using a first internal key, and a second encrypted key obtained by encrypting a second internal key using the first encrypted key, in a storage section of the system; and installing an LSI in the system, wherein the LSI stores a third encrypted key obtained by encrypting the first internal key using the second internal key, and receives the first and second encrypted keys from the storage section, the LSI including: a first decrypting circuit for decrypting the input second encrypted key using the input first encrypted key as the key; a second decrypting circuit for decrypting the third encrypted key using the output of the first decrypting circuit as the key; and a third decrypting circuit for decrypting the input first encrypted key using the output of the second decrypting circuit as the key.

Alternatively, the present invention is directed to a method for installing a key in a system, including the steps of: storing a first encrypted key obtained by encrypting a final secret key using an internal key, and a second encrypted key obtained by encrypting the internal key using a converted key obtained by conversion with a one-way function, in a storage section of the system; and installing an LSI in the system, wherein the LSI receives the first and second encrypted keys, the LSI including: a seed generator for generating a conversion seed as the source of generation of the converted key; a one-way function circuit for converting the conversion seed output from the seed generator with the one-way function using the input first encrypted key, to generate the converted key; a first decrypting circuit for decrypting the input second encrypted key using the output of the one-way function circuit as the key; and a second decrypting circuit for decrypting the input first encrypted key using the output of the first decrypting circuit as the key.

DESCRIPTION OF THE PREFERRED EMBODIMENTS

Hereinafter, embodiments of the present invention will be described with reference to the accompanying drawings.

Figure 20:
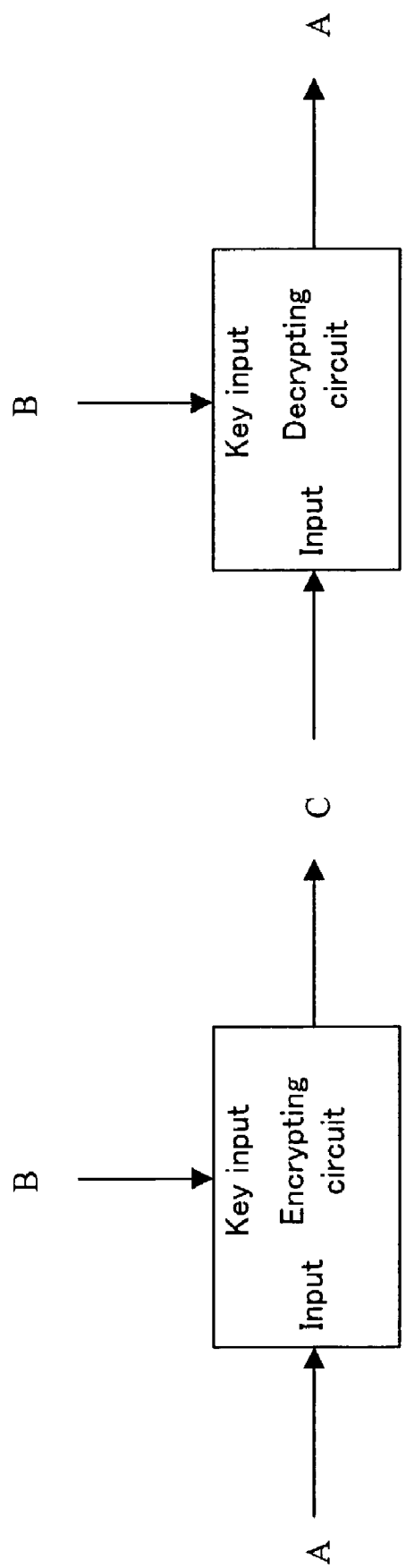
FIG. 20 is a view illustrating symmetric cryptography.

Note that in the following description, symmetric cryptography is adopted as a precondition for encryption and decryption processing. The "symmetric cryptography" refers to a type of cryptography having a feature as illustrated in FIG. 20, in which when A as the input is encrypted using B as the key and C is obtained as the encrypted key, the one obtained by decrypting C as the input using B as the key is A.

Note also that an encrypted key obtained by encrypting X using a key Y is expressed as EX(Y).

(First Embodiment)

Figure 1:
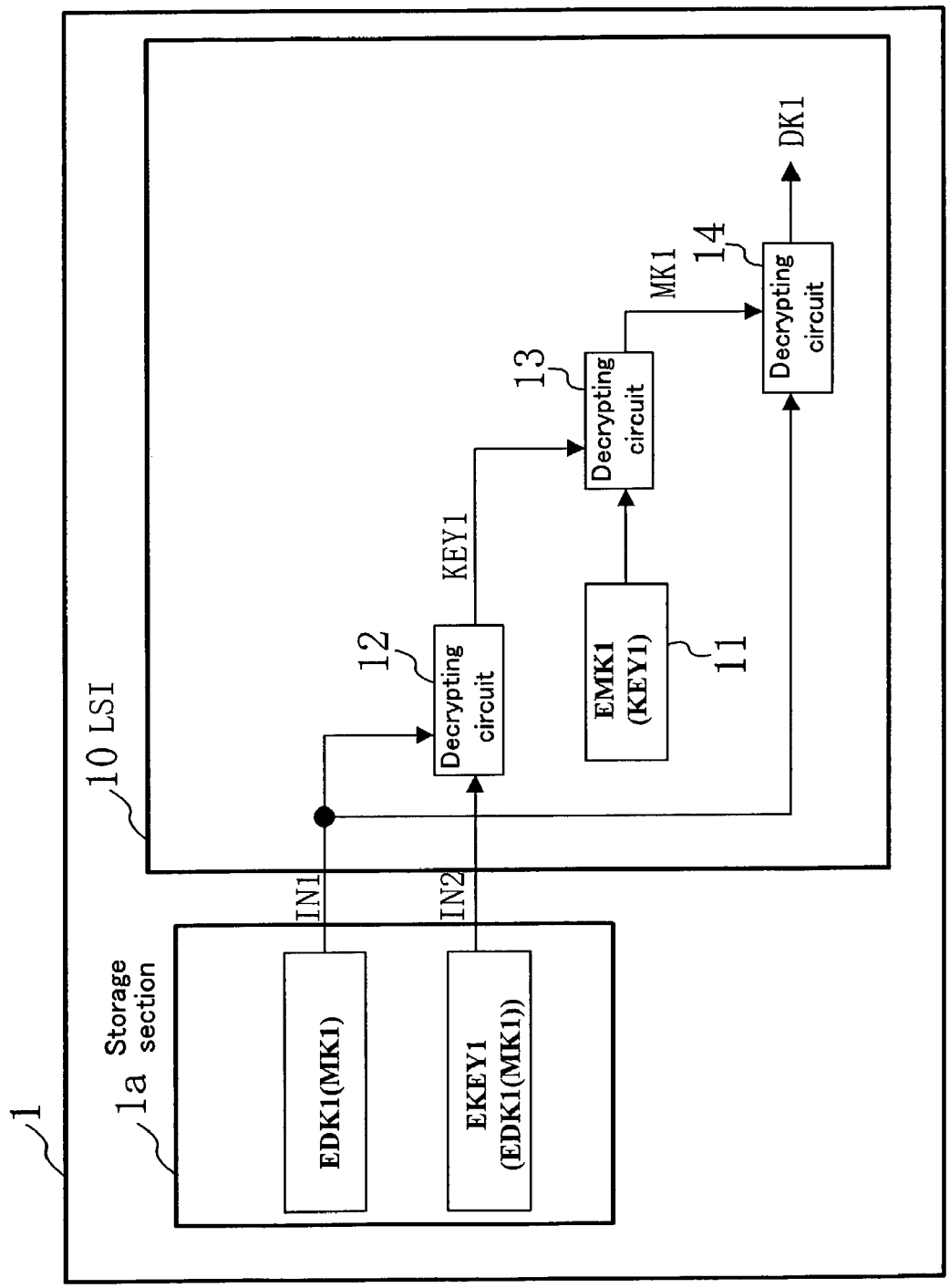
FIG. 1 is a block diagram of a key installation system of the first embodiment of the present invention.

FIG. 1 is a block diagram of a key installation system of the first embodiment of the present invention. Referring to FIG. 1, the key installation system 1 of this embodiment includes a storage section 1a and an LSI 10. The storage section 1a stores a first encrypted key EDK1(MK1) obtained by encrypting a final secret key DK1 using a first internal key MK1 and a second encrypted key EKEY1(EDK1

(MK1)) obtained by encrypting a second internal key KEY1 using the first encrypted key EDK1(MK1).

The LSI 10 stores a third encrypted key EMK1(KEY1) obtained by encrypting the first internal key MK1 using the second internal key KEY1 in a key storage 11. The LSI includes: a first decrypting circuit 12 for decrypting a second input IN2 using a first input IN1 as the key; a second decrypting circuit 13 for decrypting the third encrypted key EMK1(KEY1) stored in the key storage 11 using the output of the first decrypting circuit 12 as the key; and a third decrypting circuit 14 for decrypting the first input IN1 using the output of the second decrypting circuit 13 as the key.

Once the LSI 10 is installed in the key installation system 1, the first and second encrypted keys EDK1(MK1) and EKEY1(EDK1(MK1)) stored in the storage section 1a are input into the LSI 10 as the first and second inputs IN1 and IN2, respectively.

On receipt of the encrypted keys, the LSI 10 operates as follows. The first decrypting circuit 12 decrypts the second input IN1, that is, the second encrypted key EKEY1(EDK1 (MK1)) using the first input IN1, that is, the first encrypted key EDK1(MK1) as the key. As a result, the second internal key KEY1 is output from the second decrypting circuit 12. The second decrypting circuit 13 decrypts the third encrypted key EMK1(KEY1) stored in the key storage 11 using the output of the first decrypting circuit 12, that is, the second internal key KEY1 as the key. As a result, the first internal key MK1 is output from the second decrypting circuit 13. The third decrypting circuit 14 decrypts the first input IN1, that is, the first encrypted key EDK1(MK1) using the output of the second decrypting circuit 13, that is, the first internal key MK1 as the key. As a result, the final secret key DK1 is output from the third decrypting circuit 14.

As described above, there is realized the key installation system 1 in which the final secret key DK1 is generated by installing both the storage section 1a storing the first and second encrypted keys EDK1(MK1) and EKEY1(EDK1 (MK1)) and the LSI 10 storing the third encrypted key EMK1(KEY1) in combination. All of the secret keys in the storage section 1a and the LSI 10 have been encrypted before being installed. Therefore, with difficulty of analysis in the system, high confidentiality is ensured.

In addition, since no raw key is involved in the developing process, the concealment at the developing stage greatly improves.

Figure 2:
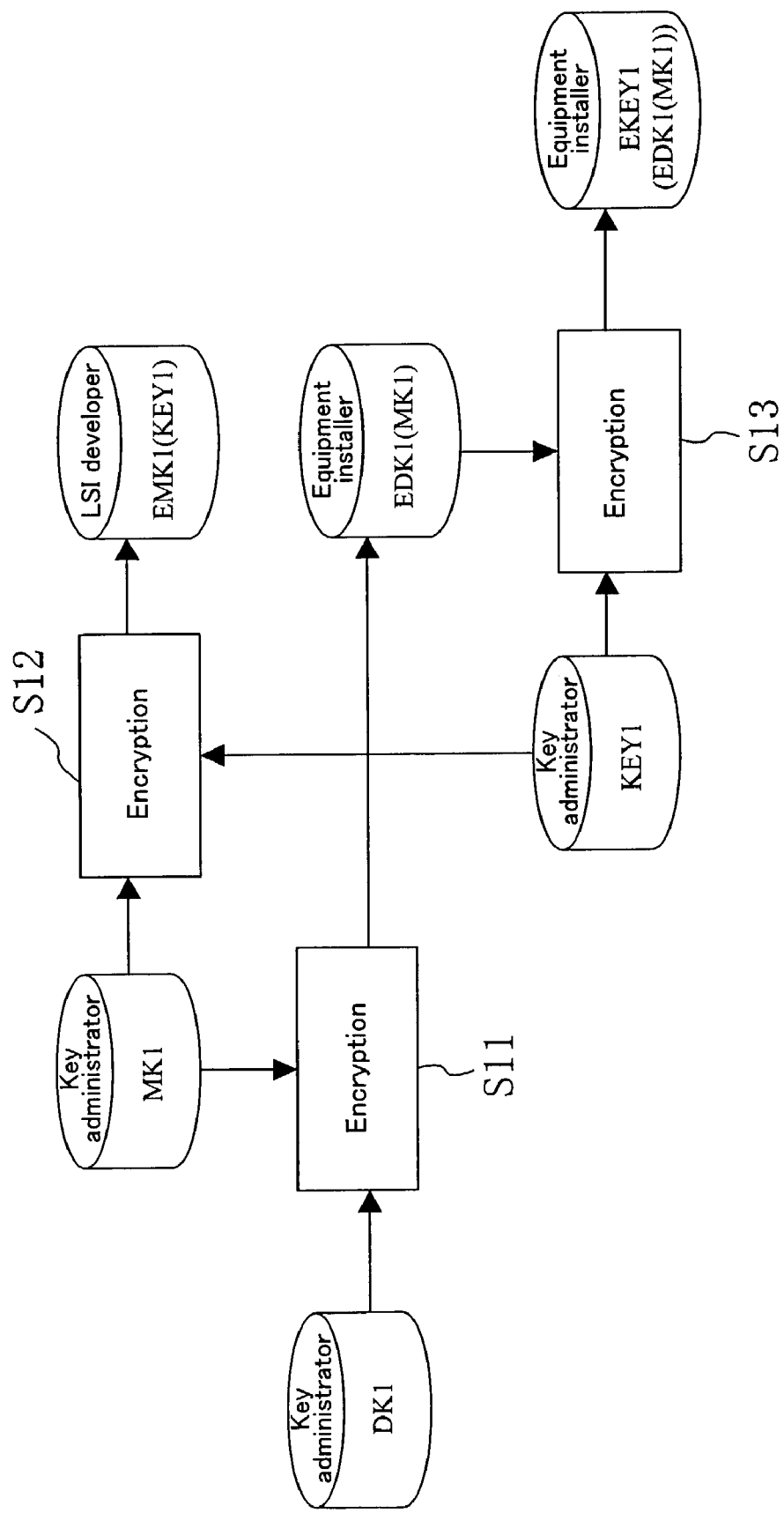
FIG. 2 is a view illustrating an example of a procedure for generation of encrypted keys used in the system of FIG. 1.

FIG. 2 is a view illustrating an example of a key generation procedure for generating the encrypted keys shown in FIG. 1. As shown in FIG. 2, the key administrator encrypts the final secret key DK1 using the arbitrary first internal key MK1 as the key, to generate the first encrypted key EDK1 (MK1) (S11). The key administrator then encrypts the first internal key MK1 using the arbitrary second internal key KEY1 as the key, to generate the third encrypted key EMK1(KEY1) (S12). The key administrator further encrypts the second internal key KEY1 using the first encrypted key EDK1(MK1) as the key, to generate the second encrypted key EKEY1(EDK1(MK1)) (S13).

The key administrator provides the first and second encrypted keys EDK1(MK1) and EKEY1(EDK1(MK1)) to the equipment installer, that is, the developer of the system 1, while providing the third encrypted key EMK1(KEY1) to the developer of the LSI 10. By generating the keys in the manner described above, there is no need to provide any of the final secret key DK1 and the first and second internal keys to the developers, and thus the concealment of the key at the developing stage greatly improves.

During manufacture of the system 1, the first and second encrypted keys EDK1(MK1) and EKEY1(EDK1(MK1)) are stored in the storage section 1a, and the LSI 10 is installed in the system.

(Second Embodiment)

Figure 3:
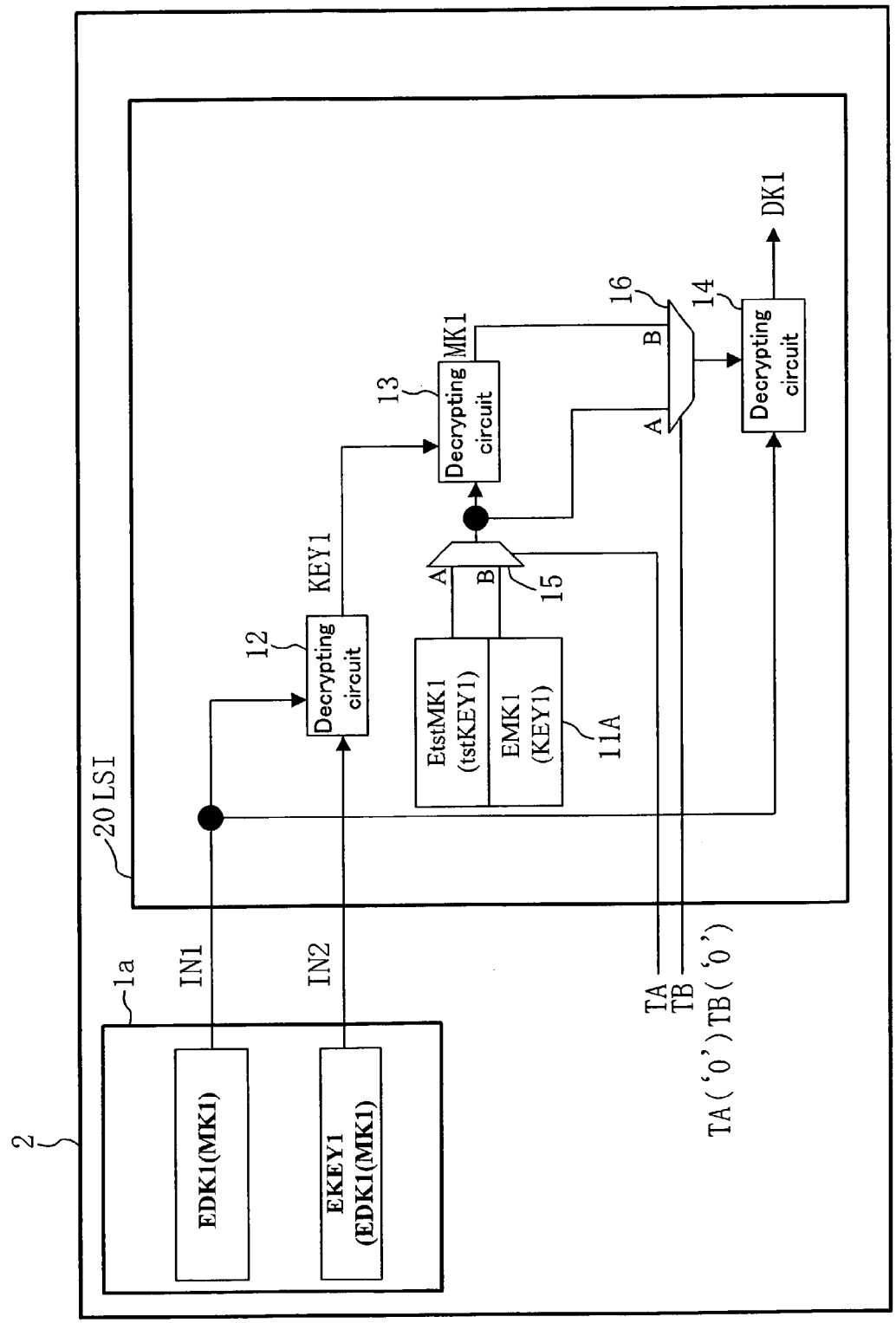
FIG. 3 is a block diagram of a key installation system of the second embodiment of the present invention.

FIG. 3 is a block diagram of a key installation system of the second embodiment of the present invention. In FIG. 3, the same components as those in FIG. 1 are denoted by the same reference numerals.

In an LSI 20, a key storage 11A stores, in addition to the third encrypted key EMK1(KEY1), a fourth encrypted key EtstMK1(tstKEY1) obtained by encrypting a first test internal key tstMK1 using a second test internal key tstKEY1.

The LSI 20 additionally includes first and second selectors 15 and 16, both of which select input A when a selection signal is "1" and input B when the selection signal "0". The first selector 15 receives the third and fourth encrypted keys EMK1(KEY1) and EtstMK1(tstKEY1) stored in the key storage 11A as the inputs, and selects and outputs either one of these inputs according to a first test signal TA. The second decrypting circuit 13 receives the output of the first selector 15 as the input. The second selector 16 receives the output of the first selector 15 and the output of the second decrypting circuit 13 as the inputs, and selects and outputs either one of these inputs according to a second test signal TB. The third decrypting circuit 14 receives the output of the second selector 16 as the key.

Both the first and second test signals TA and TB are set at "0", that is, both the first and second selectors 15 and 16 select and output the input B, to realize normal operation of the LSI 20 in the system 2.

More specifically, as in the first embodiment, the first encrypted key EDK1(MK1) as the first input IN1 and the second encrypted key EKEY1(EDK1(MK1)) as the second input IN2 are supplied from the storage section 1a to the LSI 20. The first decrypting circuit 12 decrypts the input second encrypted key EKEY1(EDK1(MK1)) using the input first encrypted key EDK1 (MK1) as the key, to generate the second internal key KEY1.

Receiving the first test signal TA indicating "0", the first selector 15 selects and outputs the input B, that is, the third encrypted key EMK1(KEY1). The second decrypting circuit 13 decrypts the output of the first selector 15, that is, the third encrypted key EMK1(KEY1) using the output of the first decrypting circuit 12, that is, the second internal key KEY1 as the key, to generate the first internal key MK1.

Receiving the second test signal TB indicating "0", the second selector 16 selects and outputs the input B, that is, the output of the second decrypting circuit 13, that is, the first internal key MK1. The third decrypting circuit 14 decrypts the input first encrypted key EDK1(MK1) using the first internal key MK1 as the key, to generate the final secret key DK1. In this way, substantially the same operation as that in the first embodiment is executed.

In FIG. 3, the final secret key DK1 will not be normally generated unless both the first and second test signals TA and TB are "0". For example, assume the case that both the first and second test signals TA and TB are set at "1".

Receiving the first test signal TA, the first selector 15 selects and outputs the input A, that is, the encrypted key EtstMK1(tstKEY1). Receiving the second test signal TB, the second selector 16 selects and outputs the input A, that is, the output of the first selector 15, which is the fourth encrypted key EtstMK1(tstKEY1). The third decrypting circuit 14 decrypts the input first encrypted key EDK1 (MK1) using the output of the selector 16, that is, the fourth encrypted key EtstMK1(tstKEY1) as the key. As a result, the third decrypting circuit 14 fails to generate the final secret key DK1.

Figure 4:
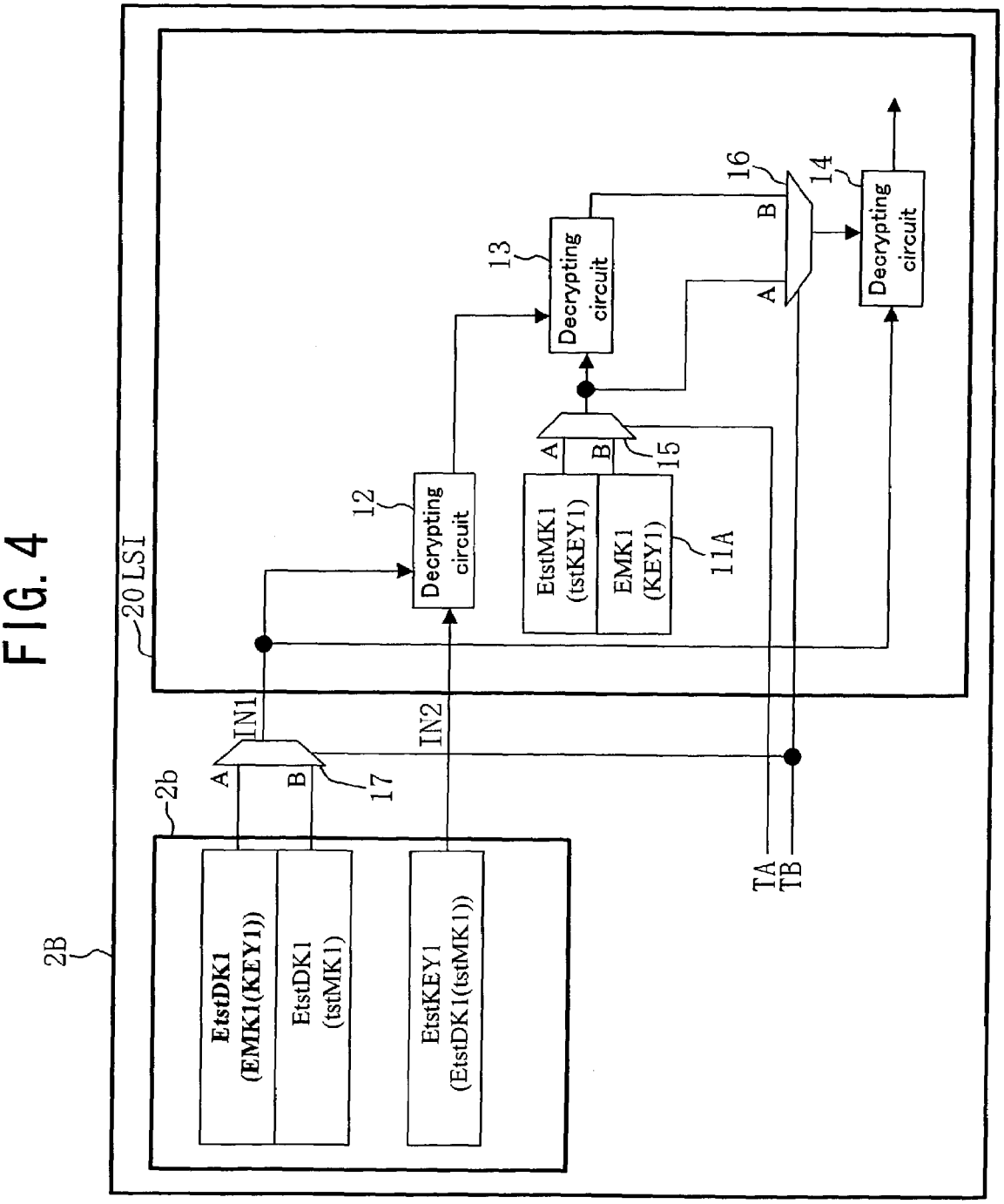
FIG. 4 is a view illustrating a secret key installation method employed during development of the system of the second embodiment.

FIG. 4 is a block diagram of a test bench used during development of the LSI 20 in this embodiment. As shown in FIG. 4, encrypted keys for LSI development are stored in a test storage section 2$b$ provided in the test bench 2B. During LSI development, therefore, the LSI can be developed without knowledge of keys used for a product.

More specifically, the test storage section 2$b$ stores a first development encrypted key EtstDK1(EMK1(KEY1)) obtained by encrypting a key tstDK1 using the third encrypted key EMK1(KEY1), a second development encrypted key EtstDK1(tstMK1) obtained by encrypting the key tstDK1 using a key tstMK1, and a third development encrypted key EtstKEY1(EtstDK1(tstMK1)) obtained by encrypting a key tstKEY1 using the second development encrypted key EtstDK1(tstMK1). All of the keys tstDK1, tstMK1 and tstKEY1 are keys for development and are not used in the actual product (system).

The test bench 2B includes a third selector 17. The third selector 17 receives the first development encrypted key EtstDK1(EMK1(KEY1)) as input A and the second development encrypted key EtstDK1(tstMK1) as input B, and selects and outputs either one of these keys according to the second test signal TB. The output of the third selector 17 is supplied to the LSI 20 as the first input IN1.

Referring to FIG. 4, first, whether or not the first, second and third decrypting circuits 12, 13 and 14 normally operate is tested. In this test, the first test signal TA is set at "1", and the second test signal TB is set at "0".

Receiving the second test signal TB, the third selector 17 selects and outputs the input B, that is, the second development encrypted key EtstDK1(tstMK1). The first decrypting circuit 12 decrypts the third development encrypted key EtstKEY1(EtstDK1(tstMK1)) as the input IN2 using the second development encrypted key EtstDK1(tstMK1) as the key, to generate the second test internal key tstKEY1.

Receiving the first test signal TA, the first selector 15 selects and outputs the input A, that is, the fourth encrypted key EtstMK1(tstKEY1). The second decrypting circuit 13 decrypts the output of the first selector 15, that is, the fourth encrypted key EtstMK1(tstKEY1) using the output of the first decrypting circuit 12, that is, the second test internal key tstKEY1 as the key, to generate the first test internal key tstMK1. Receiving the second test signal TB, the second selector 16 selects and outputs the input B, that is, the output of the second decrypting circuit 13, which is the first test internal key tstMK1. The third encrypting circuit 14 decrypts the input IN1, that is, the second development encrypted key EtstDK1(tstMK1) using the output of the second selector 16, that is, the first test internal key tstMK1, to generate the test final secret key tstDK1.

Next, whether or not the third encrypted key EMK1(KEY1) used in the actual product has been installed correctly is tested. In this test, the first test signal TA is set "0", and the second test signal TB is set at "1".

Receiving the second test signal TB, the third selector 17 selects and outputs the input A, that is, the first development encrypted key EtstDK1(EMK1(KEY1)). The first development encrypted key EtstDK1(EMK1(KEY1)) is supplied to the third decrypting circuit 14 as the input.

Receiving the first test signal TA, the first selector 15 selects and outputs the input B, that is, the third encrypted key EMK1(KEY1). Receiving the second test signal TB, the second selector 16 selects and outputs the input A, that is, the output of the first selector 15, which is the third encrypted key EMK1(KEY1). The third encrypting circuit 14 decrypts the first development encrypted key EtstDK1(EMK1(KEY1)) using the third encrypted key EMK1(KEY1) as the key, to generate the test final secret key tstDK1. In this way, by examining whether or not the test final secret key tstDK1 is normally generated, whether or not the third encrypted key EMK1(KEY1) has been correctly installed can be determined.

Figure 5:
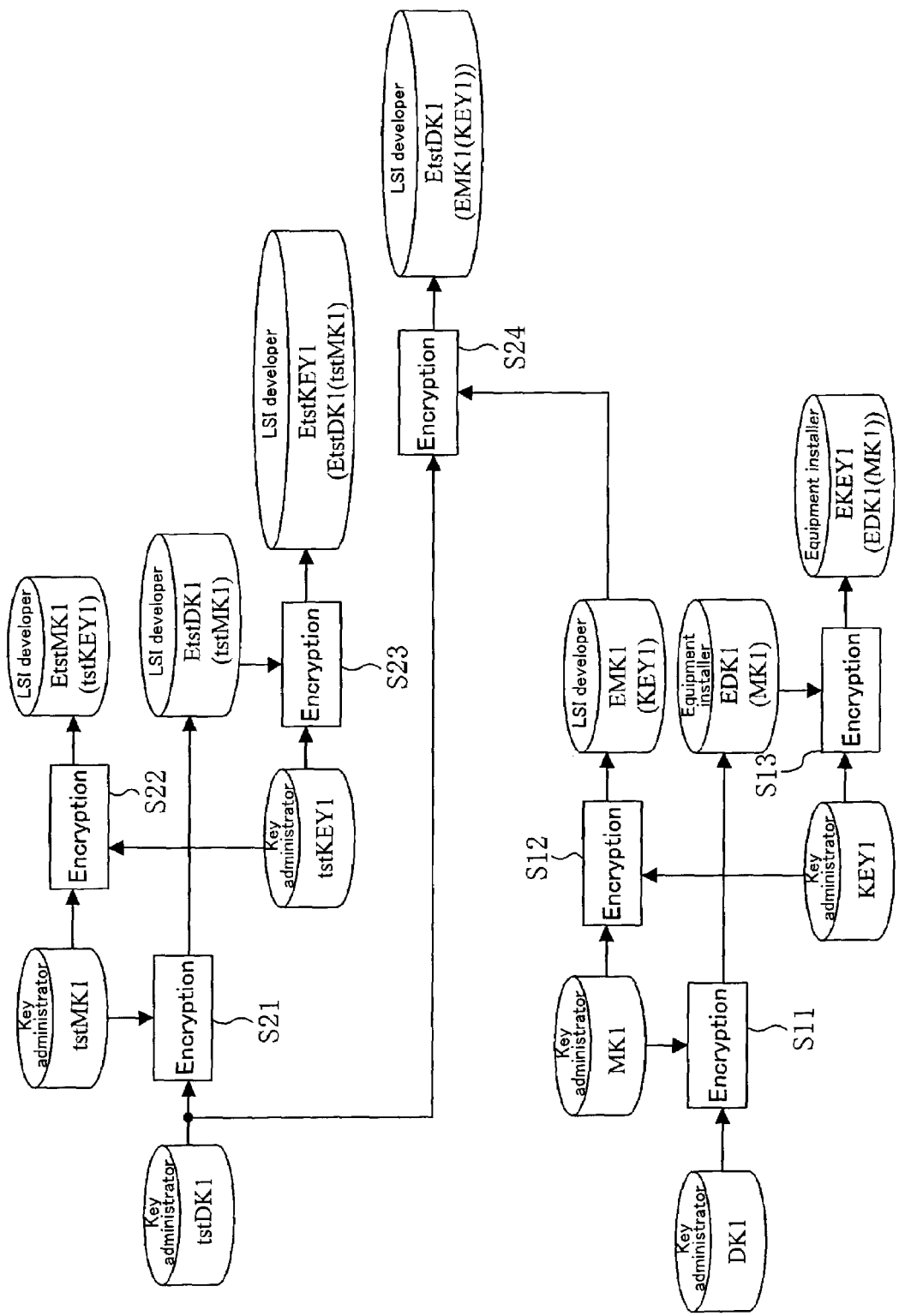
FIG. 5 is a view illustrating an example of a procedure for generating encrypted keys used in FIGS. 3 and 4.

FIG. 5 is an illustration of an example of a key generation procedure for generating the encrypted keys shown in FIGS. 3 and 4. As shown in FIG. 5, the key administrator encrypts the final secret key DK1 using the arbitrary first internal key MK1 as the key, to generate the first encrypted key EDK1(MK1) (S11). The key administrator then encrypts the first internal key MK1 using the arbitrary second internal key KEY1 as the key, to generate the third encrypted key EMK1(KEY1) (S12). The key administrator further encrypts the second internal key KEY1 using the first encrypted key EDK1(MK1) as the key, to generate the second encrypted key EKEY1(EDK1(MK1)) (S13).

The key administrator provides the first and second encrypted keys EDK1(MK1) and EKEY1(EDK1(MK1)) to the equipment installer, while providing the third encrypted key EMK1(KEY1) to the developer of the LSI 20. Up to this stage, the procedure is substantially the same as that shown in FIG. 2.

In addition to the steps described above, the key administrator encrypts the test final secret key tstDK1 using the arbitrary first test internal key tstMK1, to generate the second development encrypted key EtstDK1(tstMK1) (S21). The key administrator then encrypts the first test internal key tstMK1 using the arbitrary second test internal key tstKEY1, to generate the fourth encrypted key EtstMK1(tstKEY1) (S22). The key administrator further encrypts the second test internal key tstKEY1 using the second development encrypted key EtstDK1(tstMK1), to generate the third development encrypted key EtstKEY1(tstEDK1(tstMK1)) (S23). Finally, the key administrator encrypts the test final secret key tstDK1 using the third encrypted key EMK1(KEY1), to generate the first development encrypted key EtstDK1(EMK1 (KEY1)) (S24).

The key administrator provides the fourth encrypted key EtstMK1(tstKEY1) and the first, second and third development encrypted keys EtstDK1(EMK1(KEY1)), EtstDK1(tstMK1) and EtstKEY1(EtstDK1(tstMK1)) to the developer of the LSI 20.

(Third Embodiment)

Figure 6:
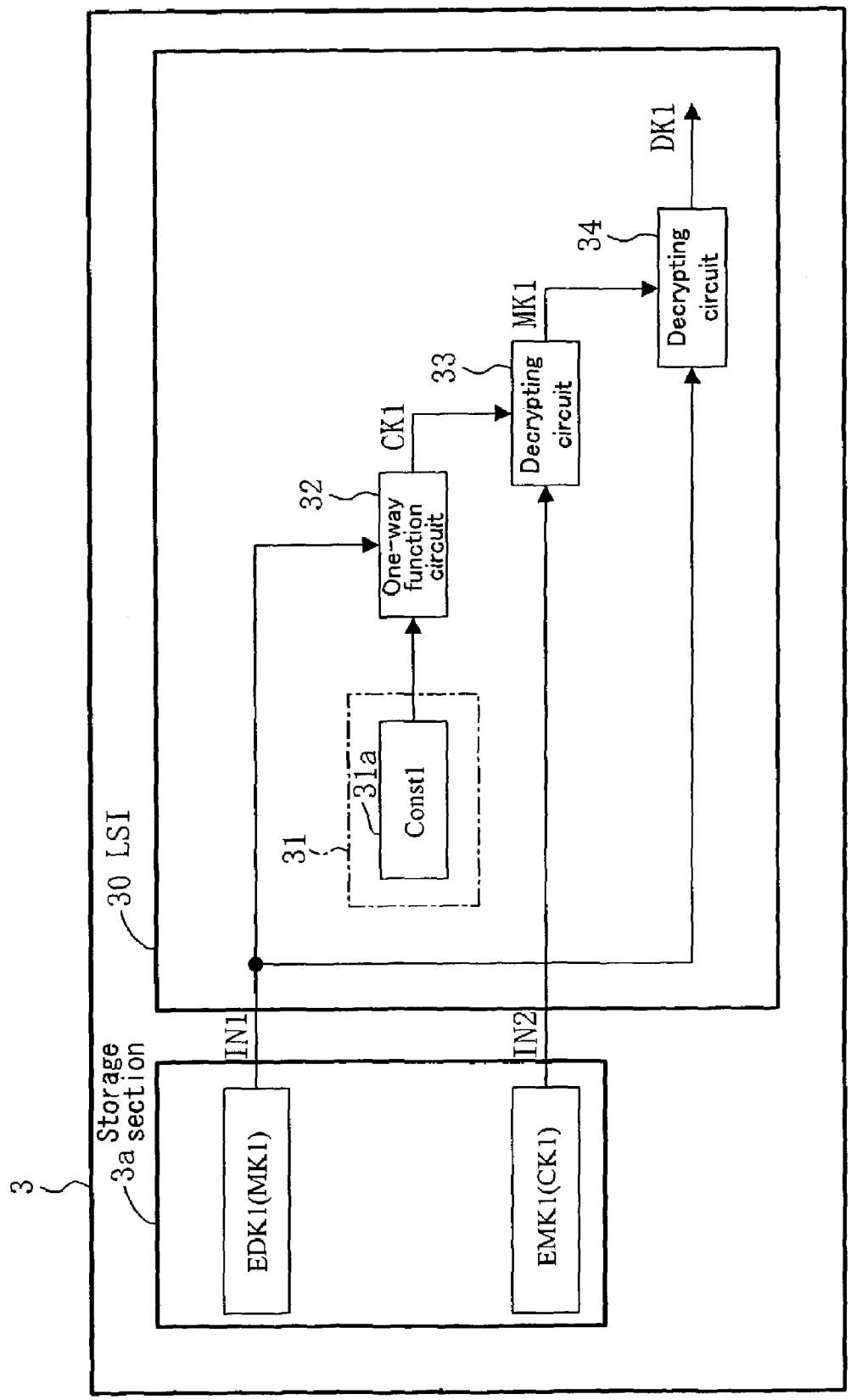
FIG. 6 is a block diagram of a key installation system of the third embodiment of the present invention.

FIG. 6 is a block diagram of a key installation system of the third embodiment of the present invention. Referring to FIG. 6, the key installation system 3 of this embodiment includes a storage section 3$a$ and an LSI 30. The storage section 3$a$ stores a first encrypted key EDK1(MK1) obtained by encrypting a final secret key DK1 using an internal key MK1 and a second encrypted key EMK1(CK1) obtained by encrypting the internal key MK1 using a converted key CK1 obtained by conversion with a one-way function.

The LSI 30 includes a constant storage 31$a$ storing an arbitrary constant Const1. The constant storage 31$a$ constitutes a seed generator 31 from which the constant Const1 is output as a conversion seed that is the source of generation of the converted key CK1. The LSI 30 also includes: a one-way function circuit 32 for converting the constant Const1 as the conversion seed with a one-way function using a first input IN1 to generate the converted key CK1; a first decrypting circuit 33 for decrypting a second input IN2 using the output of the one-way function circuit 32 as the key; and a second decrypting circuit 33 for decrypting the first input IN1 using the output of the first decrypting circuit 33 as the key.

Once the LSI 30 is installed in the key installation system 3, the first and second encrypted keys EDK1(MK1) and EMK1(CK1) stored in the storage section 3a are input into the LSI 30 as the first and second inputs IN1 and IN2, respectively.

On receipt of the encrypted keys, the LSI 30 operates as follows. The one-way function circuit 32 converts the constant Const1 output from the constant storage 31a with the same one-way function as that used for generation of the converted key CK1 using the first input IN1, that is, the first encrypted key EDK1(MK1) as the key. As a result, the converted key CK1 is generated and output from the one-way function circuit 32. The first decrypting circuit 33 decrypts the second input IN2, that is, the second encrypted key EMK1(CK1) using the output of the one-way function circuit 32, that is, the converted key CK1 as the key. As a result, the internal key MK1 is generated and output from the first decrypting circuit 33. The second decrypting circuit 34 decrypts the first input IN1, that is, the first encrypted key EDK1(MK1) using the output of the first decrypting circuit 33, that is, the internal key MK1 as the key. As a result, the final secret key DK1 is generated and output from the second decrypting circuit 34.

Assume that the internal key MK1 is changed to MK2, for example. Then, the new internal key MK2 is used to encrypt the final secret key DK1, and the resultant first encrypted key EDK1(MK2) is stored in the storage section 3a. The arbitrary constant Const1 stored in the constant storage 31a of the LSI 30 is converted with a one-way function using the first encrypted key EDK1(MK2) as the key to generate a new converted key CK2. The new internal key MK2 is encrypted using the new converted key CK2 and the resultant second encrypted key EMK2(CK2) is stored in the storage section 3a.

Despite the new setting of the first and second encrypted keys to be stored in the storage section 3a as described above, the final secret key DK1 is generated correctly in substantially the same manner as that described above. In other words, the encrypted keys to be stored in the system 3 can be set arbitrarily without changing the constant Const1 stored in the LSI 30. This indicates that the key for encryption can be set individually for each system using a common LSI, and thus the confidentiality can be further enhanced.

Figure 7:
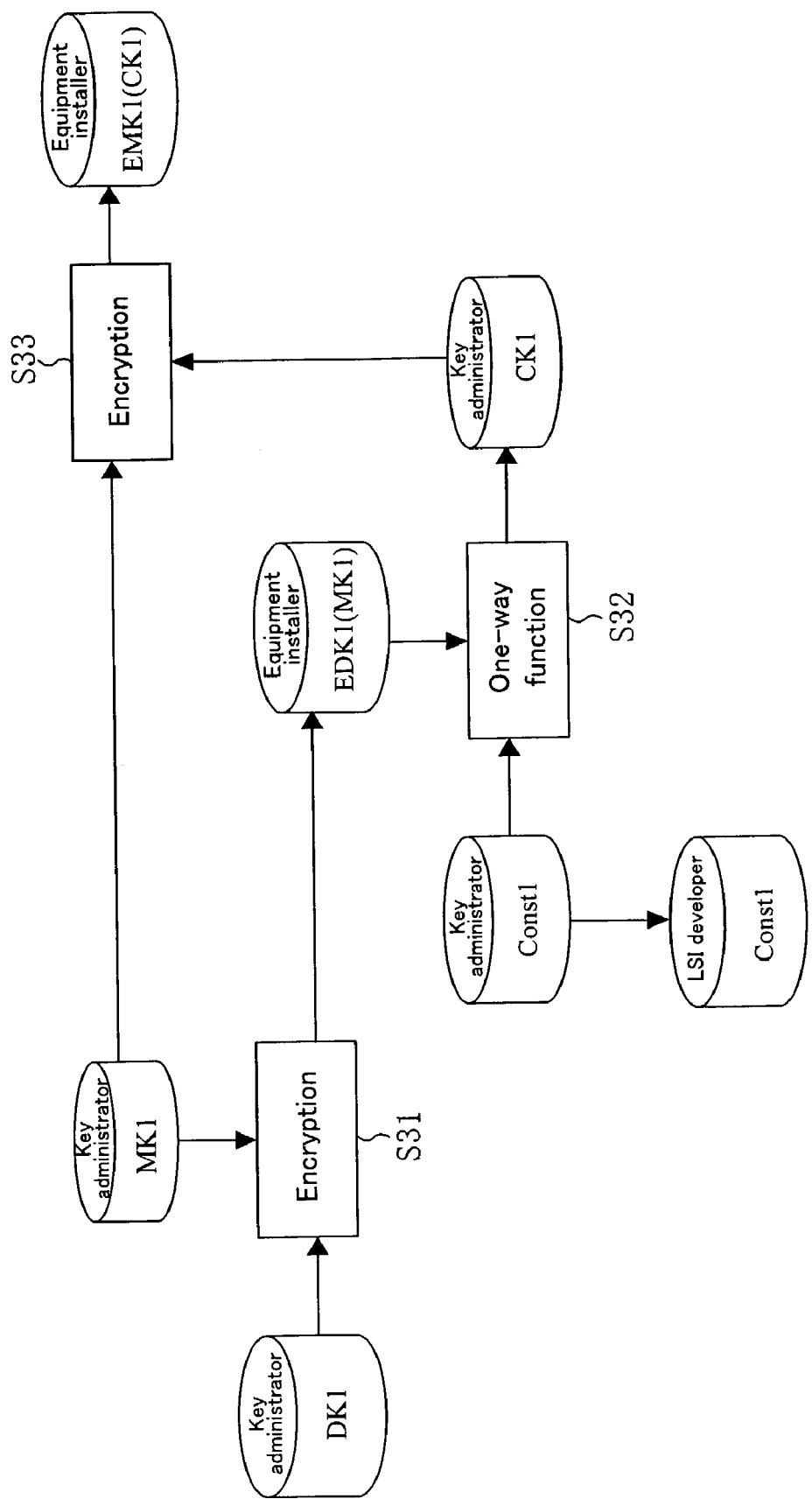
FIG. 7 is a view illustrating an example of a procedure for generating encrypted keys used in the system of FIG. 6.

FIG. 7 is an illustration of an example of a key generation procedure for generating the encrypted keys shown in FIG. 6. As shown in FIG. 7, the key administrator encrypts the final secret key DK1 using the arbitrary internal key MK1 as the key, to generate the first encrypted key EDK1(MK1) (S31). The key administrator then converts the constant Const1 with a one-way function using the first encrypted key EDK1(MK1) as the key input, to generate the converted key CK1 (S32). The key administrator further encrypts the internal key MK1 using the converted key CK1 as the key, to generate the second encrypted key EMK1(CK1) (S33). The key administrator provides the first and second encrypted keys EDK1(MK1) and EMK1(CK1) to the equipment installer, that is, the developer of the system 3, while providing the constant Const1 to the developer of the LSI 30.

During manufacture of the system 3, the first and second encrypted keys EDK1(MK1) and EMK1(CK1) are stored in the storage section 3a, and the LSI 30 is installed in the system 3.

(Fourth Embodiment)

Figure 8:
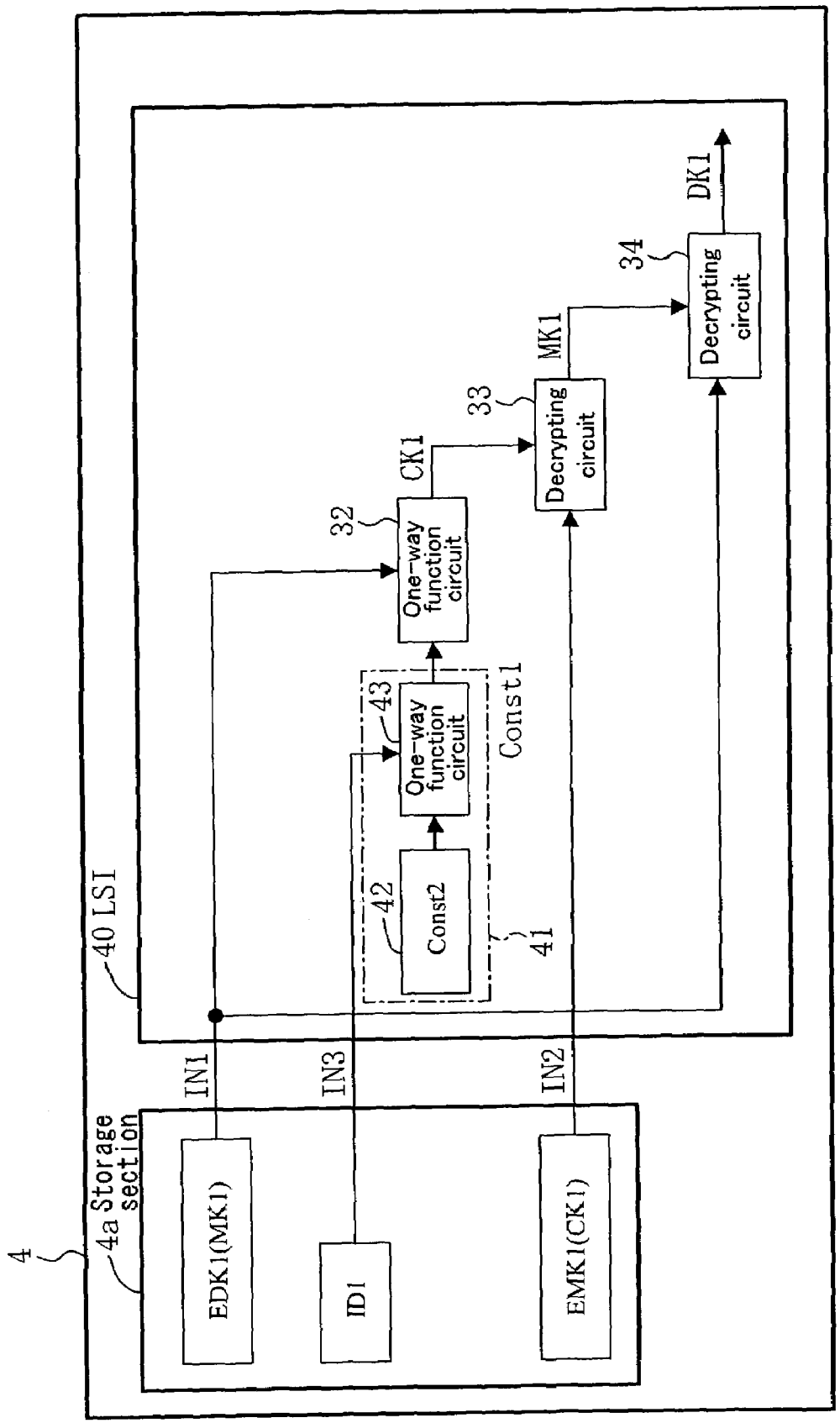
FIG. 8 is a block diagram of a key installation system of the fourth embodiment of the present invention.

FIG. 8 is a block diagram of a key installation system of the fourth embodiment of the present invention. In FIG. 8, the same components as those in FIG. 6 are denoted by the same reference numerals. The key installation system 4 of this embodiment includes a storage section 4a and an LSI 40. The storage section 4a stores a first constant ID1 in addition to the first and second encrypted keys EDK1(MK1) and EMK1(CK1).

The LSI 40 includes a seed generator 41 composed of a constant storage 42 and a second one-way function circuit 43, in place of the seed generator 31 of the LSI 30 shown in FIG. 6. The constant storage 42 stores a second constant Const2. The second one-way function circuit 43 converts the second constant Const2 with a one-way function using a third input IN3. The output of the second one-way function circuit 43 is supplied to the one-way function circuit 32 as the conversion seed.

Once the LSI 40 is installed in the key installation system 4, the first and second encrypted keys EDK1(MK1) and EMK1(CK1) and the first constant ID1 stored in the storage section 4a are input into the LSI 40 as the first, second and third inputs IN1, IN2 and IN3, respectively.

On receipt of the inputs, the LSI 40 operates as follows. The second one-way function circuit 43 of the seed generator 41 converts the constant Const2 output from the constant storage 42 with a one-way function using the third input IN3, that is, the first constant ID1. As a result, a conversion seed Const1 is output from the seed generator 41. The one-way function circuit 32 converts the conversion seed Const1 output from the seed generator 41 with the same one-way function as that used for generation of the converted key CK1 using the first input IN1, that is, the first encrypted key EDK1(MK1). As a result, the converted key CK1 is generated and output from the one-way function circuit 32. The subsequent operations of the first and second decrypting circuits 33 and 34 are the same as those in the third embodiment.

Figure 9:
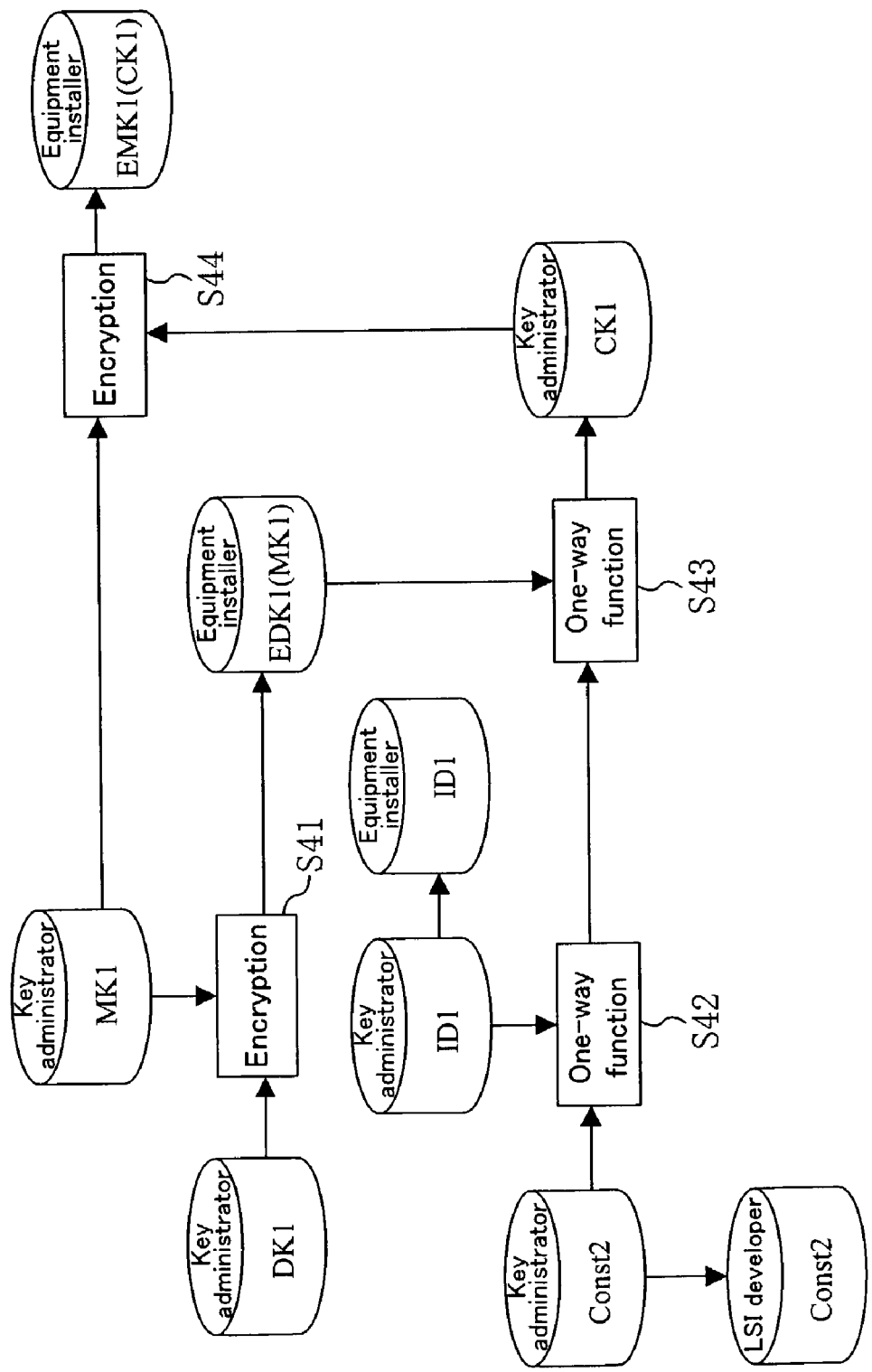
FIG. 9 is a view illustrating an example of a procedure for generating encrypted keys used in the system of FIG. 8.

FIG. 9 is an illustration of an example of a key generation procedure for generating the encrypted keys shown in FIG. 8. As shown in FIG. 9, the key administrator encrypts the final secret key DK1 using the arbitrary internal key MK1 as the key, to generate the first encrypted key EDK1(MK1) (S41). The key administrator then converts the second constant Const2 with a one-way function using the first constant ID1 as the key (S42), and the conversion result is further converted with a one-way function using the first encrypted key EDK1(MK1) as the key, to generate the converted key CK1 (S43). The key administrator further encrypts the internal key MK1 using the converted key CK1 as the key, to generate the second encrypted key EMK1 (CK1) (S44). The key administrator provides the first constant ID1 and the first and second encrypted keys EDK1 (MK1) and EMK1(CK1) to the equipment installer, that is, the developer of the system 4, while providing the second constant Const2 to the developer of the LSI 40.

(Fifth Embodiment)

Figure 10:
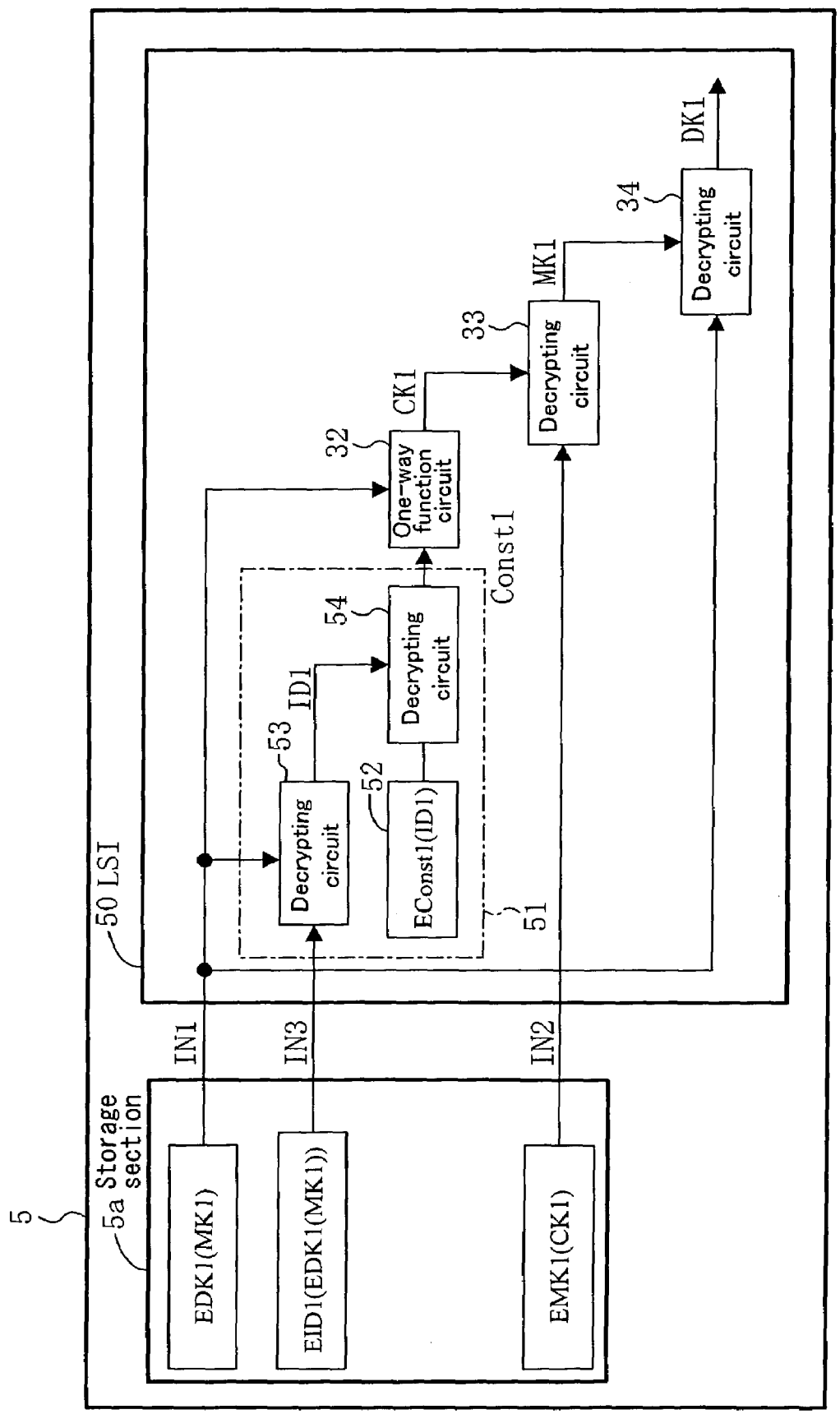
FIG. 10 is a block diagram of a key installation system of the fifth embodiment of the present invention.

FIG. 10 is a block diagram of a key installation system of the fifth embodiment of the present invention. In FIG. 10, the same components as those in FIG. 6 are denoted by the same reference numerals. The key installation system 5 of this embodiment includes a storage section 5a and an LSI 50. The storage section 5a stores, in addition to the first and second encrypted keys EDK1(MK1) and EMK1(CK1) described in the third embodiment, a third encrypted key EID1(EDK1(MK1)) obtained by encrypting the first constant ID1 using the first encrypted key EDK1(MK1).

The LSI 50 includes a seed generator 51 composed of a constant storage 52 and third and fourth decrypting circuits 53 and 54, in place of the seed generator 31 of the LSI 30 shown in FIG. 6. The third decrypting circuit 53 decrypts the third input IN3 using the first input IN1 as the key. The constant storage 52 stores a fourth encrypted key Econst1 (ID1) obtained by encrypting the conversion seed Const1 as the source of generation of the converted key CK1 using the first constant ID1. The fourth decrypting circuit 54 decrypts the fourth encrypted key Econst1(ID1) using the output of the third decrypting circuit 53 as the key. The output of the fourth decrypting circuit 54 is supplied to the one-way function circuit 32 as the conversion seed.

Once the LSI 50 is installed in the key installation system 5, the first, second and third encrypted keys EDK1(MK1), EMK1(CK1) and EID1(EDK1(MK1)) stored in the storage section 5a are input into the LSI 50 as the first, second and third inputs IN1, IN2 and IN3, respectively.

On receipt of the inputs, the LSI 50 operates as follows. The third decrypting circuit 53 of the seed generator 51 decrypts the third input IN3, that is, the third encrypted keys EID1(EDK1(MK1)) using the first input IN1, that is, the first encrypted key EDK1(MK1) as the key. As a result, the first constant ID1 is output from the third decrypting circuit 53. The fourth decrypting circuit 54 of the seed generator 51 decrypts the fourth encrypted key Econst1(ID1) stored in the constant storage 52 using the output of the third decrypting circuit 53, that is, the first constant ID1. As a result, the conversion seed Const1 is generated and output from the seed generator 51. The one-way function circuit 32 converts the conversion seed Const1 output from the seed generator 51 with the same one-way function as that used in generation of the converted key CK1 using the first input IN1, that is, the first encrypted key EDK1(MK1). As a result, the converted key CK1 is generated and output from the one-way function circuit 32. The subsequent operations of the first and second decrypting circuits 33 and 34 are the same as those in the third embodiment.

Figure 11:
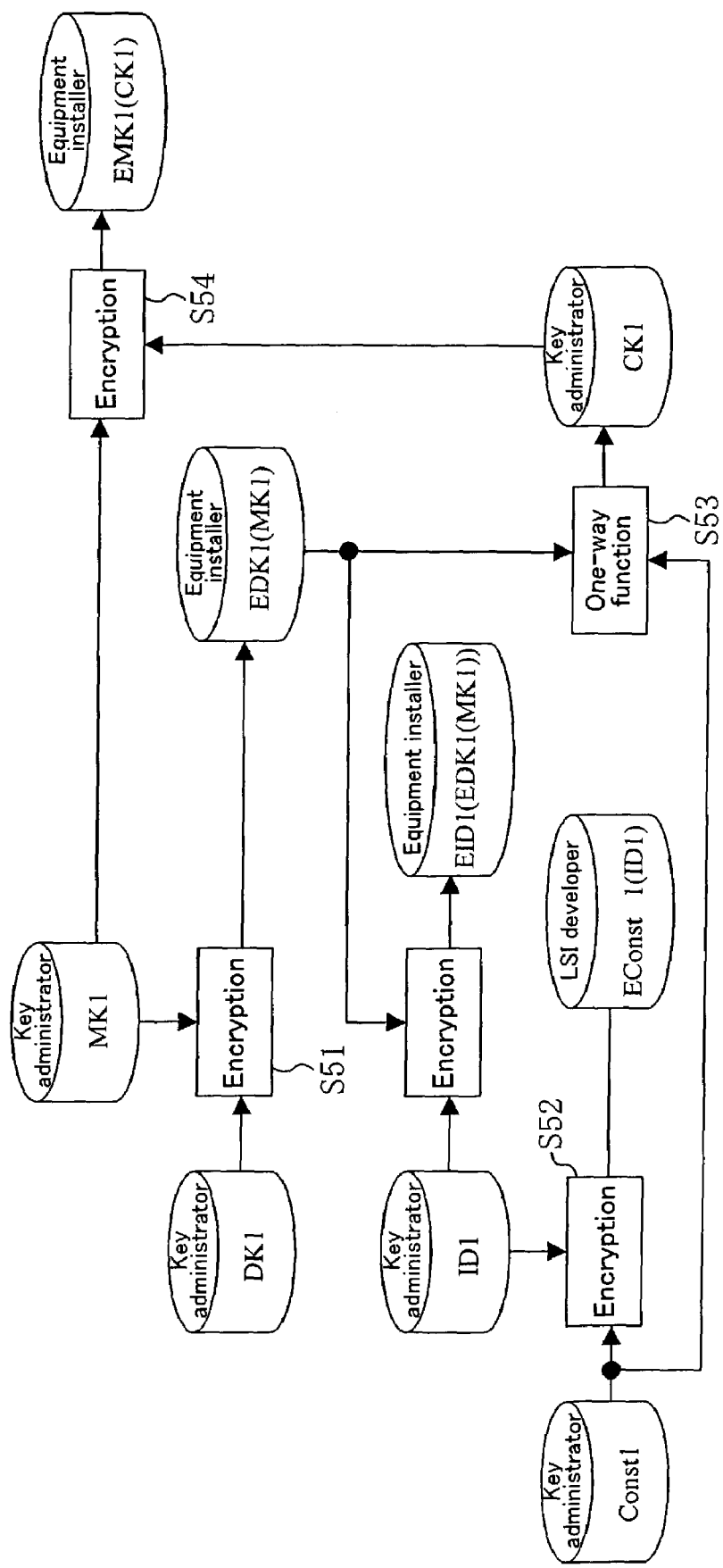
FIG. 11 is a view illustrating an example of a procedure for generating encrypted keys used in the system of FIG. 10.

FIG. 11 is an illustration of an example of a key generation procedure for generating the encrypted keys shown in FIG. 10. As shown in FIG. 11, the key administrator encrypts the final secret key DK1 using the arbitrary internal key MK1 as the key, to generate the first encrypted key EDK1 (MK1) (S51). The key administrator then encrypts the constant Const1 as the conversion seed using the first constant ID1 as the key, to generate the fourth encrypted key Econst1(ID1) (S52). The key administrator also converts the constant Const1 with a one-way function using the first encrypted key EDK1(MK1), to generate the converted key CK1 (S53). The key administrator further encrypts the internal key MK1 using the converted key CK1 as the key, to generate the second encrypted key EMK1(CK1) (S54). The key administrator provides the first, second and third encrypted keys EDK1(MK1), EMK1(CK1) and EID1 (EDK1(MK1)) to the equipment installer, that is, the developer of the system 5, while providing the fourth encrypted key Econst1(ID1) to the developer of the LSI 50.

(Sixth Embodiment)

Figure 12:
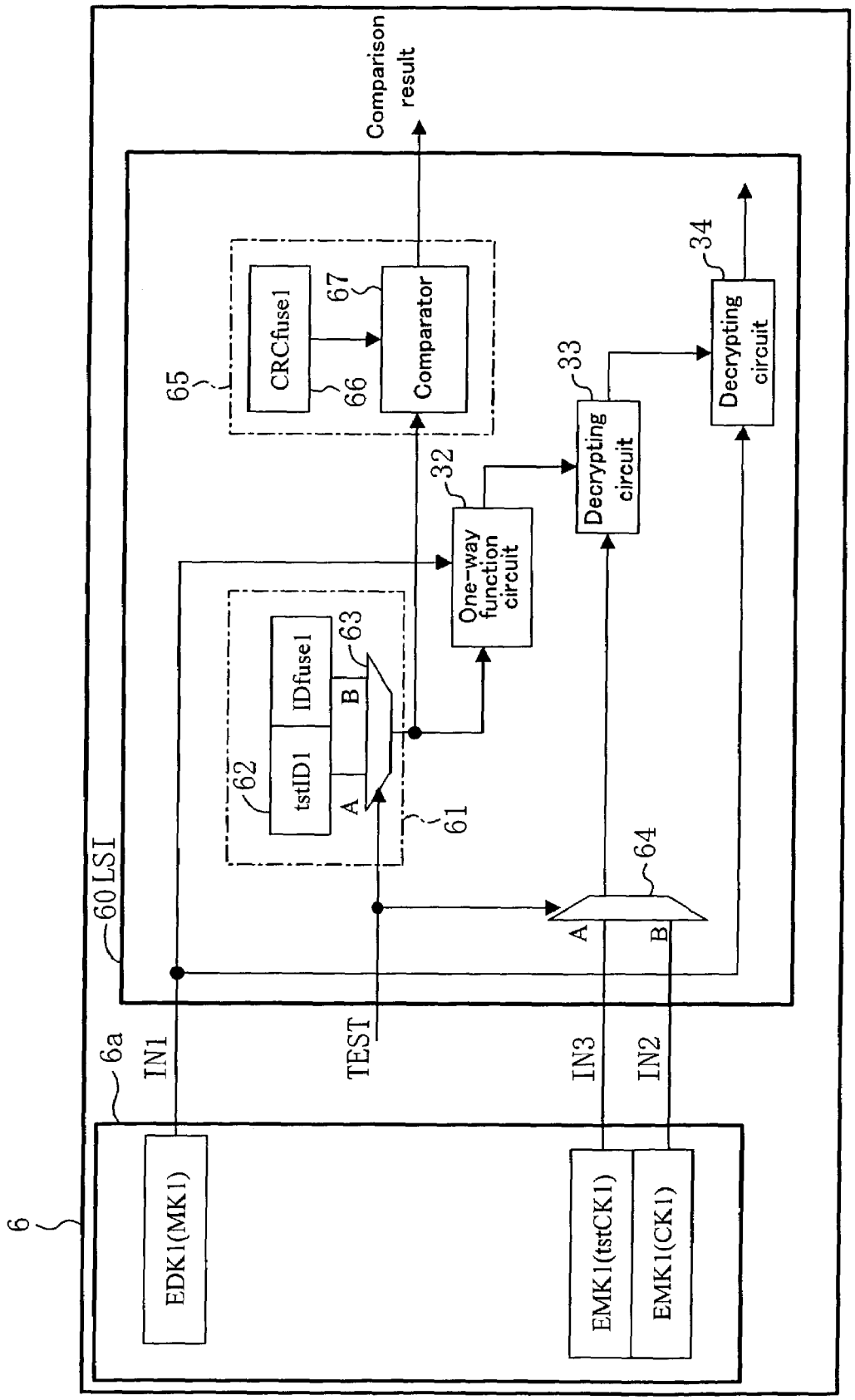
FIG. 12 is a block diagram of a key installation system of the sixth embodiment of the present invention.

FIG. 12 is a block diagram of a key installation system of the sixth embodiment of the present invention. In FIG. 12, the same components as those in FIG. 6 are denoted by the same reference numerals. The key installation system 6 of this embodiment includes a storage section 6a and an LSI 60. The storage section 6a stores, in addition to the first and second encrypted keys EDK1(MK1) and EMK1(CK1) described in the third embodiment, a third encrypted key EMK1(tstCK) obtained by encrypting the internal key MK1 using a test converted key tstCK1 as the key. The test converted key tstCK1 is obtained by conversion with the same one-way function as that used for generation of the converted key CK1.

The LSI 60 is different from the LSI 30 shown in FIG. 6 in the following points.

The LSI 60 includes a first selector 64 receiving the second and third inputs IN2 and IN3 as the inputs for selecting and outputting either one of the inputs according to a test signal TEST. The first decrypting circuit 33 receives the output of the first selector 64 as the input.

The LSI 60 also includes a seed generator 61 composed of a constant storage 62 and a second selector 63, in place of the seed generator 31 in FIG. 6. The constant storage 62 stores a conversion seed IDfuse1 as the source of generation of the converted key CK1 and a test conversion seed tstID1 as the source of generation of the test converted key tstCK1. The constant storage 62 is configured to implement an arbitrary value as the constant IDfuse1 by fuse cutting with laser trimming or the like. The second selector 63 selects and outputs either one of the conversion seed IDfuse1 and the test conversion seed tstID1 according to the test signal TEST. The output of the second selector 63 is supplied to the one-way function circuit 32 as the conversion seed.

The LSI 60 also includes a verification circuit 65 for verifying the output of the second selector 63. The verification circuit 65 includes: a constant storage 66 storing a fuse-implemented constant CRCfuse1 that corresponds to the result of redundancy operation of the constant IDfuse1; and a comparator 67 for performing the redundancy operation for the output of the second selector 63 and comparing the operation result with the constant CRCfuse1 stored in the constant storage 66.

Once the LSI 60 is installed in the key installation system 6, the first, second and third encrypted keys EDK1(MK1), EMK1(CK1) and EMK1(tstCK1) stored in the storage section 6a are input into the LSI 60 as the first, second and third inputs IN1, IN2 and IN3, respectively.

First, the operation of the LSI 60 during testing will be described. During testing, the test signal TEST is set at "1".

Receiving the test signal TEST of "1", the first selector 64 selects and outputs the input IN3, that is, the third encrypted keyEMK1(tstCK1). Also receiving the test signal TEST of "1", the second selector 63 selects and outputs the test conversion seed tstID1 stored in the constant storage 62. That is, the test conversion seed tstID1 is output from the seed generator 61 as the conversion seed.

The one-way function circuit 32 converts the test conversion seed tstID1 output from the seed generator 61 with the same one-way function as that used for generation of the converted key CK1 and the test converted key tstCK1 using the first input IN1, that is, the first encrypted key EDK1 (MK1). By this conversion, the test converted key tstCK1 is generated and output from the one-way function circuit 32.

The first decrypting circuit 33 decrypts the output of the first selector 64, that is, the third encrypted key EMK1 (tstCK1) using the output of the one-way function circuit 32, that is, the test converted key tstCK1 as the key. As a result, the internal key MK1 is output from the first decrypting circuit 33. The second decrypting circuit 34 decrypts the first input IN1, that is, the first encrypted key EDK1(MK1) using the output of the first decrypting circuit 33, that is, the internal key MK1, to thereby generate the final secret key DK1.

Next, the operation of the LSI 60 during normal working will be described. During normal working, the test signal is set at "0".

Receiving the test signal TEST of "0", the first selector 64 selects and outputs the input IN2, that is, the second encrypted key EMK1(CK1). Also receiving the test signal TEST of "0", the second selector 63 selects and outputs the conversion seed IDfuse1 stored in the constant storage 62. That is, the conversion seed IDfuse1 is output from the seed generator 61.

The one-way function circuit 32 converts the conversion seed IDfuse1 output from the seed generator 61 with a one-way function using the first encrypted key EDK1 (MK1). By this conversion, the converted key CK1 is generated and output from the one-way function circuit 32. The first decrypting circuit 33 decrypts the output of the first selector 64, that is, the second encrypted key EMK1(CK1) using the output of the one-way function circuit 32, that is, the converted key CK1 as the key. As a result, the internal key MK1 is output from the first decrypting circuit 33. Subsequently, as in the case of testing, the final secret key DK1 is generated from the second decrypting circuit 34.

The output of the second selector 63 is also supplied to the comparator 67 of the verification circuit 65. The comparator 67 checks whether or not the result of redundancy operation performed for the output of the second selector 63 matches with the fuse-implemented constant CRCfuse1 in the constant storage 66. This enables verification of the correctness of the value of the conversion seed Idfuse1 stored in the seed generator 61.

Figure 13:
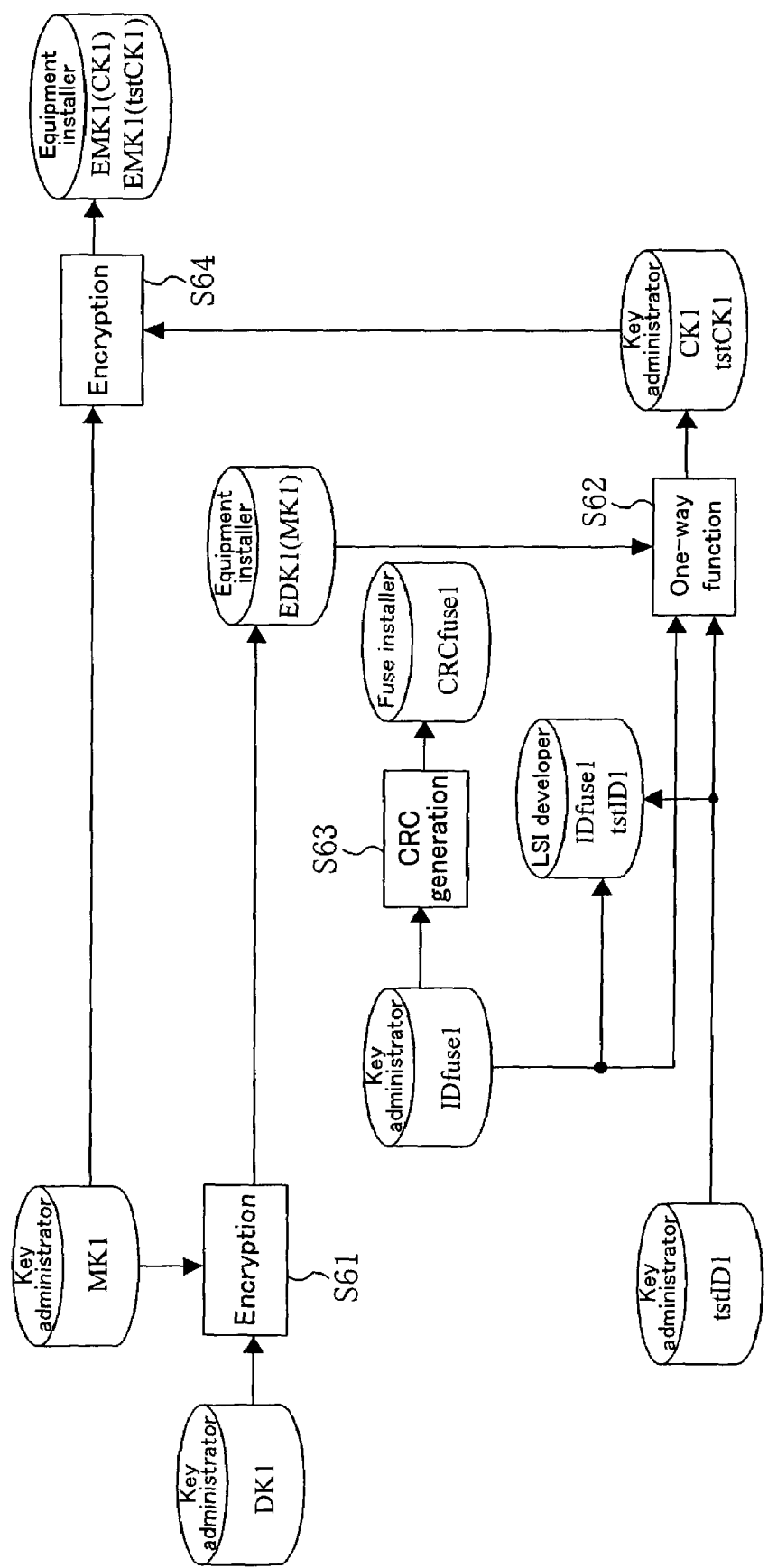
FIG. 13 is a view illustrating an example of a procedure for generating encrypted keys used in the system of FIG. 12.

FIG. 13 is an illustration of an example of a key generation procedure for generating the encrypted keys shown in FIG. 12. As shown in FIG. 13, the key administrator encrypts the final secret key DK1 using the arbitrary internal key MK1 as the key, to generate the first encrypted key EDK1(MK1) (S61). The key administrator then converts the constant IDfuse1 as the conversion seed with a one-way function using the first encrypted key EDK1(MK1) as the key, to generate the converted key CK1 (S62), and also performs redundancy operation (for example, CRC16) for the constant IDfuse1, to generate the verification constant CRCfuse1 (S63). The key administrator further encrypts the internal key MK1 using the converted key CK1 as the key, to generate the second encrypted key EMK1(CK1) (S64).

Likewise, the key administrator converts the constant tstID1 as the test conversion seed with a one-way function using the first encrypted key EDK1(MK1) as the key, to generate the test converted key tstCK1 (S62). The key administrator further encrypts the internal key MK1 using the test converted key tstCK1 as the key, to generate the third encrypted key EMK1(tstCK1) (S64). The key administrator provides the first, second and third encrypted keys EDK1 (KM1), EMK1(CK1) and EMK1(tstCK1) to the equipment installer, that is, the developer of the system 6, while providing the test conversion seed tstID1, the conversion seed IDfuse1 and the verification constant CRCfuse1 to the developer of the LSI 60.

(Seventh Embodiment)

Figure 14:
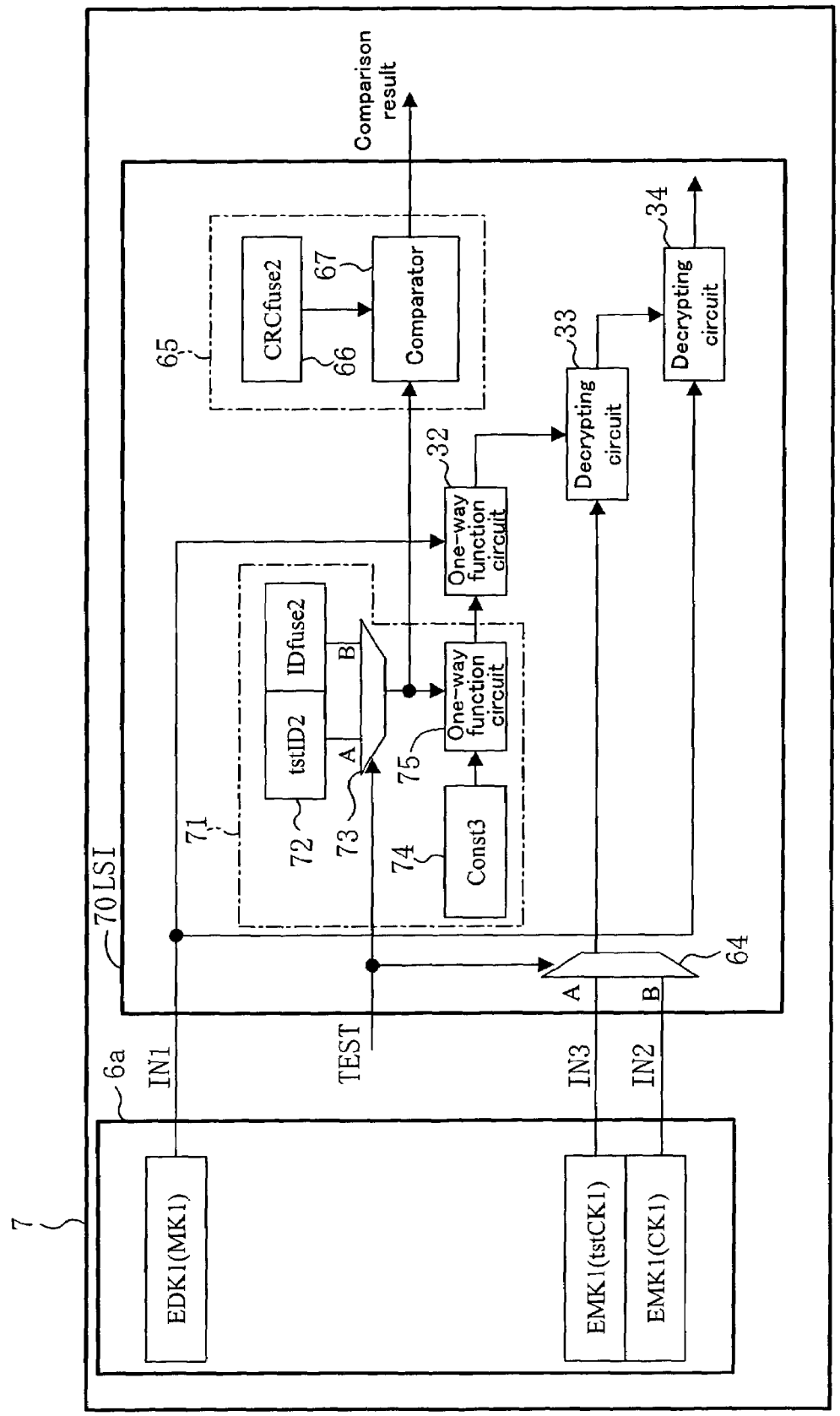
FIG. 14 is a block diagram of a key installation system of the seventh embodiment of the present invention.

FIG. 14 is a block diagram of a key installation system of the seventh embodiment of the present invention. In FIG. 14, the same components as those in FIG. 12 are denoted by the same reference numerals. The key installation system 7 of this embodiment includes a storage section 7a, having the same configuration as that in FIG. 12, and an LSI 70.

The LSI 70 includes a seed generator 71 composed of a first constant storage 72, a second selector 73, a second constant storage 74 and a second one-way function circuit 75, in place of the seed generator 61 in FIG. 12. The first constant storage 72 stores a first constant IDfuse2 as the source of the conversion seed IDfuse1 and a second constant tstID2 as the source of the test conversion seed tstID1. The first constant storage 72 is configured to implement an arbitrary value as the first constant IDfuse2 by fuse cutting with laser trimming or the like. The second selector 63 selects and outputs either one of the first and second constants IDfuse2 and tstID2 according to the test signal TEST. The second constant storage 74 stores a third constant Const3. The second one-way function circuit 75 converts the third constant Const3 with a one-way function using the output of the second selector 73.

The constant storage 66 of the verification circuit 65 stores the fuse-implemented constant CRCfuse2 that corresponds to the result of redundancy operation for the first constant IDfuse2, in place of the constant CRCfuse1.

First, the operation of the LSI 70 during testing will be described. During testing, the test signal TEST is set at "1".

Receiving the test signal TEST of "1", the first selector 64 selects and outputs the input IN3, that is, the third encrypted key EMK1(tstCK1). Also receiving the test signal TEST of "1", the second selector 73 selects and outputs the second constant tstID2 stored in the first constant storage 72. The second one-way function circuit 75 converts the third constant Const3 stored in the second constant storage 74 with a one-way function using the output of the second selector 73, that is, the second constant tstID2. As a result, the test conversion seed tstID1 is output from the seed generator 71 as the conversion seed.

The one-way function circuit 32 converts the test conversion seed tstID1 output from the seed generator 71 with a one-way function using the first input IN1, that is, the first encrypted key EDK1(MK1). The subsequent operation is substantially the same as that in the sixth embodiment described above.

Next, the operation of the LSI 70 during normal working will be described. During normal working, the test signal is set at "0".

Receiving the test signal TEST of "0", the first selector 64 selects and outputs the input IN2, that is, the second encrypted key EMK1(CK1). Also receiving the test signal TEST of "0", the second selector 73 selects and outputs the first constant IDfuse2 stored in the constant storage 72. The second one-way function circuit 75 converts the third constant Const3 stored in the second constant storage 74 with a one-way function using the output of the second selector 73, that is, the first constant IDfuse2. As a result, the conversion seed IDfuse1 is output from the seed generator 71.

The one-way function circuit 32 converts the conversion seed IDfuse1 output from the seed generator 71 with a one-way function using the first encrypted key EDK1 (MK1). The subsequent operation is substantially the same as that in the sixth embodiment described above.

The output of the second selector 73 is also supplied to the comparator 67 of the verification circuit 65. The comparator 67 checks whether or not the result of redundancy operation performed for the output of the second selector 73 matches with the fuse-implemented constant CRCfuse2 in the constant storage 66. This enables verification of the correctness of the first constant IDfuse2 stored in the seed generator 71.

Figure 15:
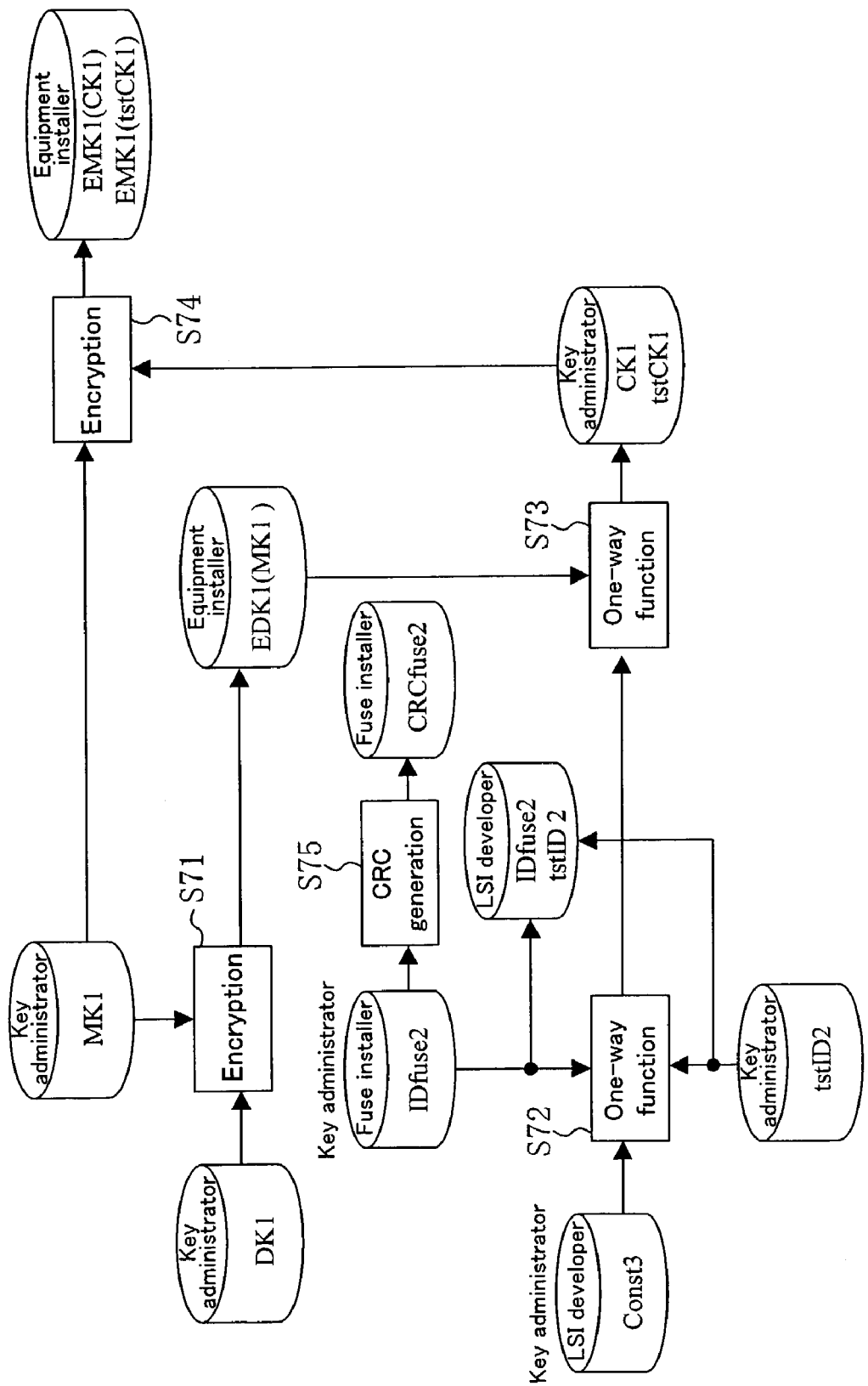
FIG. 15 is a view illustrating an example of a procedure for generating encrypted keys used in the system of FIG. 14.

FIG. 15 is an illustration of an example of a key generation procedure for generating the encrypted keys shown in FIG. 14. As shown in FIG. 15, the key administrator encrypts the final secret key DK1 using the arbitrary internal key MK1 as the key, to generate the first encrypted key EDK1(MK1) (S71). The key administrator then converts the third constant Const3 with a one-way function using the first constant IDfuse2 as the key (S72), and further converts the conversion result with a one-way function using the first encrypted key EDK1(MK1) as the key, to generate the converted key CK1 (S73). Subsequently, the key administrator encrypts the internal key MK1 using the converted key CK1 as the key, to generate the second encrypted key EMK1(CK1) (S74). Redundancy operation (for example, CRC16) is performed for the first constant IDfuse2, to generate the constant CRCfuse2 (S75).

Likewise, the key administrator converts the third constant Const3 with a one-way function using the second constant tstID2 as the key (S72), and further converts the conversion result with a one-way function using the first encrypted key EDK1(MK1), to generate the test converted key tstCK1 (S73). Subsequently, the key administrator encrypts the internal key MK1 using the test converted key tstCK1 as the key, to generate the third encrypted key EMK1(tstCK1).

The key administrator provides the first, second and third encrypted keys EDK1(MK1), EMK1(CK1) and EMK1(tstCK1) to the equipment installer, that is, the developer of the system 7, while providing the first, second and third constants IDfuse2, tstID2 and Const3 and the verification constant CRCfuse2 to the developer of the LSI 70.

(Eighth Embodiment)

Figure 16:
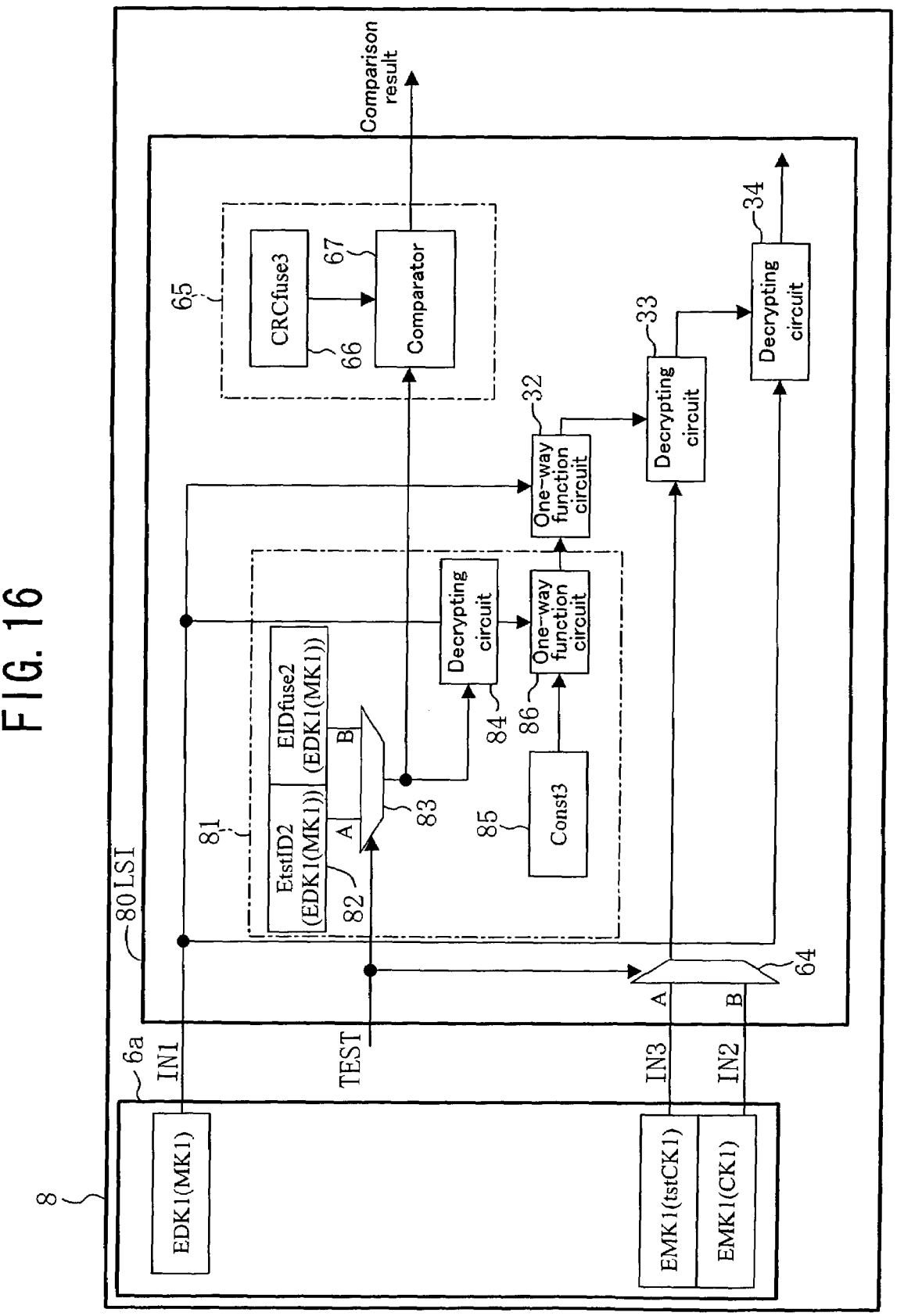
FIG. 16 is a block diagram of a key installation system of the eighth embodiment of the present invention.

FIG. 16 is a block diagram of a key installation system of the eighth embodiment of the present invention. In FIG. 16, the same components as those in FIG. 12 are denoted by the same reference numerals. The key installation system 8 of this embodiment includes a storage section 8a having the same configuration as that in FIG. 12, and an LSI 80.

The LSI 80 includes a seed generator 81 composed of a first constant storage 82, a second selector 83, a third decrypting circuit 84, a second constant storage 85 and a second one-way function circuit 86, in place of the seed generator 61 in FIG. 12. The first constant storage 82 stores a fourth encrypted key EIDfuse2(EDK1(MK1)) obtained by encrypting the first constant IDfuse2 using the first encrypted key EDK1(MK1), and a fifth encrypted key EtstID2(EDK1(MK1)) obtained by encrypting the second constant tstID2 using the first encrypted key EDK1(MK1). The second selector 83 selects and outputs either one of the fourth and fifth encrypted keys EIDfuse2(EDK1(MK1)) and EtstID2(EDK1(MK1)) according to the test signal TEST. The third decrypting circuit 84 decrypts the output of the second selector 83 using the first input IN1, that is, the first encrypted key EDK1(MK1) as the key. The second constant storage 85 stores the third constant Const3. The second one-way function circuit 86 converts the third constant Const3 with a one-way function using the output of the third decrypting circuit 84.

The constant storage 66 of the verification circuit 65 stores a fuse-implemented constant CRCfuse3 corresponding to the result of redundancy operation for the fourth encrypted key EIDfuse2(EDK1(MK1)), in place of the constant CRCfuse1.

First, the operation of the LSI 80 during testing will be described. During testing, the test signal TEST is set at "1".

Receiving the test signal TEST of "1", the first selector 64 selects and outputs the input IN3, that is, the third encrypted key EMK1(tstCK1). Also receiving the test signal TEST of "1", the second selector 83 selects and outputs the fifth encrypted key EtstID2(EDK1(MK1)) stored in the first constant storage 82. The third decrypting circuit 84 decrypts the output of the second selector 83, that is, the fifth encrypted key EtstID2(EDK1(MK1)) using the first input, that is, the first encrypted key EDK1(MK1). As a result, the constant tstID2 is output from the third decrypting circuit 84. The second one-way function circuit 86 converts the third constant Const3 stored in the second constant storage 85 with a one-way function using the output of the third decrypting circuit 84, that is, the constant tstID2. As a result, the test conversion seed tstID1 is output from the seed generator 81 as the conversion seed.

The one-way function circuit 32 converts the test conversion seed tstID1 output from the seed generator 81 with a one-way function using the first input IN1, that is, the first encrypted key EDK1(MK1). The subsequent operation is substantially the same as that in the sixth embodiment described above.

Next, the operation of the LSI 80 during normal working will be described. During normal working, the test signal is set at "0".

Receiving the test signal TEST of "0", the first selector 64 selects and outputs the input IN2, that is, the second encrypted key EMK1(CK1). Also receiving the test signal TEST of "0", the second selector 83 selects and outputs the fourth encrypted key EIDfuse2(EDK1(MK1)) stored in the first constant storage 82. The third decrypting circuit 84 decrypts the output of the second selector 83, that is, the fourth encrypted key EIDfuse2(EDK1(MK1)) using the first encrypted key EDK1(MK1) as the key. As a result, the constant IDfuse2 is output from the third decrypting circuit 84. The second one-way function circuit 86 converts the third constant Const3 with a one-way function using the output of the third decrypting circuit 84, that is, the constant IDfuse2. As a result, the conversion seed IDfuse1 is output from the seed generator 81.

The one-way function circuit 32 converts the conversion seed IDfuse1 output from the seed generator 81 with a one-way function using the first encrypted key EDK1(MK1). The subsequent operation is substantially the same as that in the sixth embodiment described above.

The output of the second selector 83 is also supplied to the comparator 67 of the verification circuit 65. The comparator 67 checks whether or not the result of redundancy operation performed for the output of the second selector 83 matches with the fuse-implemented constant CRCfuse3 in the constant storage 66. This enables verification of the correctness of the fourth encrypted key EIDfuse2(EDK1(MK1)) stored in the seed generator 61.

Figure 17:
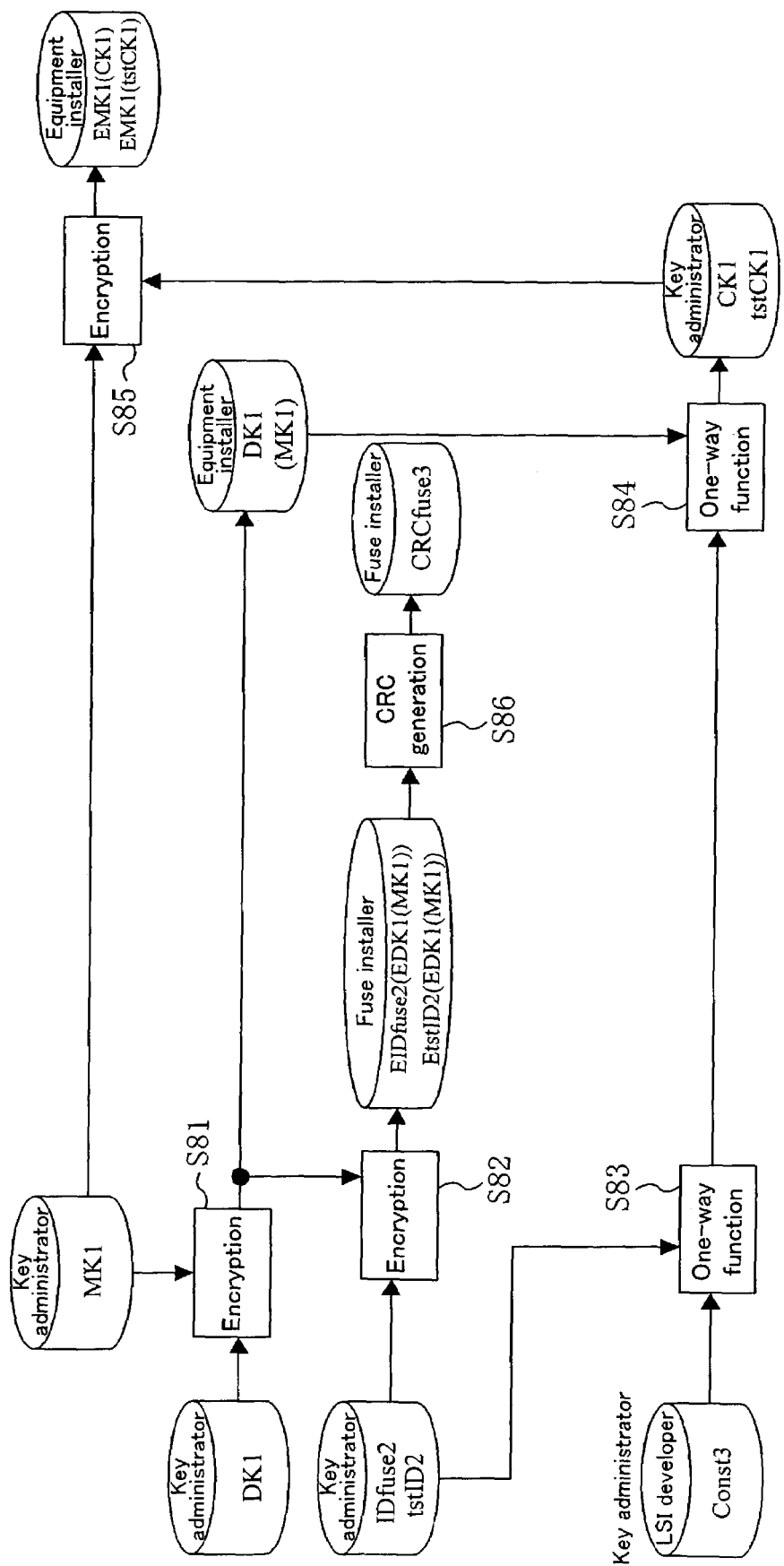
FIG. 17 is a view illustrating an example of a procedure for generating encrypted keys used in the system of FIG. 16.

FIG. 17 is an illustration of an example of a key generation procedure for generating the encrypted keys shown in FIG. 16. As shown in FIG. 17, the key administrator encrypts the final secret key DK1 using the arbitrary internal key MK1 as the key, to generate the first encrypted key EDK1(MK1) (S81). The key administrator then encrypts the first and second constants IDfuse2 and tstID2 using the first encrypted key EDK1(MK1) as the key, to generate the fourth and fifth encrypted keys EIDfuse2(EDK1(MK1)) and EtstID2(EDK1(MK1)), respectively (S82). The key administrator also converts the third constant Const3 with a one-way function using the first constant IDfuse2 as the key (S83), and further converts the conversion result with a one-way function using the first encrypted key EDK1(MK1) as the key, to generate the converted key CK1 (S84). Subsequently, the key administrator encrypts the internal key MK1 using the converted key CK1 as the key, to generate the second encrypted key EMK1(CK1) (S85).

Redundancy operation (for example, CRC16) is performed for the fourth encrypted key EIDfuse2(EDK1(MK1)), to generate the verification constant CRCfuse3 (S86).

Likewise, the key administrator converts the third constant Const3 with a one-way function using the second constant tstID2 as the key (S83), and further converts the conversion result with a one-way function using the first encrypted key EDK1(MK1) as the key, to generate the test converted key tstCK1 (S84). Subsequently, the key administrator encrypts the internal key MK1 using the test converted key tstCK1 as the key, to generate the third encrypted key EMK1(tstCK1).

The key administrator provides the first, second and third encrypted keys EDK1(MK1), EMK1(CK1) and EMK1 (tstCK1) to the equipment installer, that is, the developer of the system 8, while providing the third constant Const3, the fourth and fifth encrypted keys EIDfuse2(EDK1(MK1)) and EtstID2(EDK1(MK1)), and the verification constant CRCfuse3 to the developer of the LSI 80.

(Ninth Embodiment)

Figure 18:
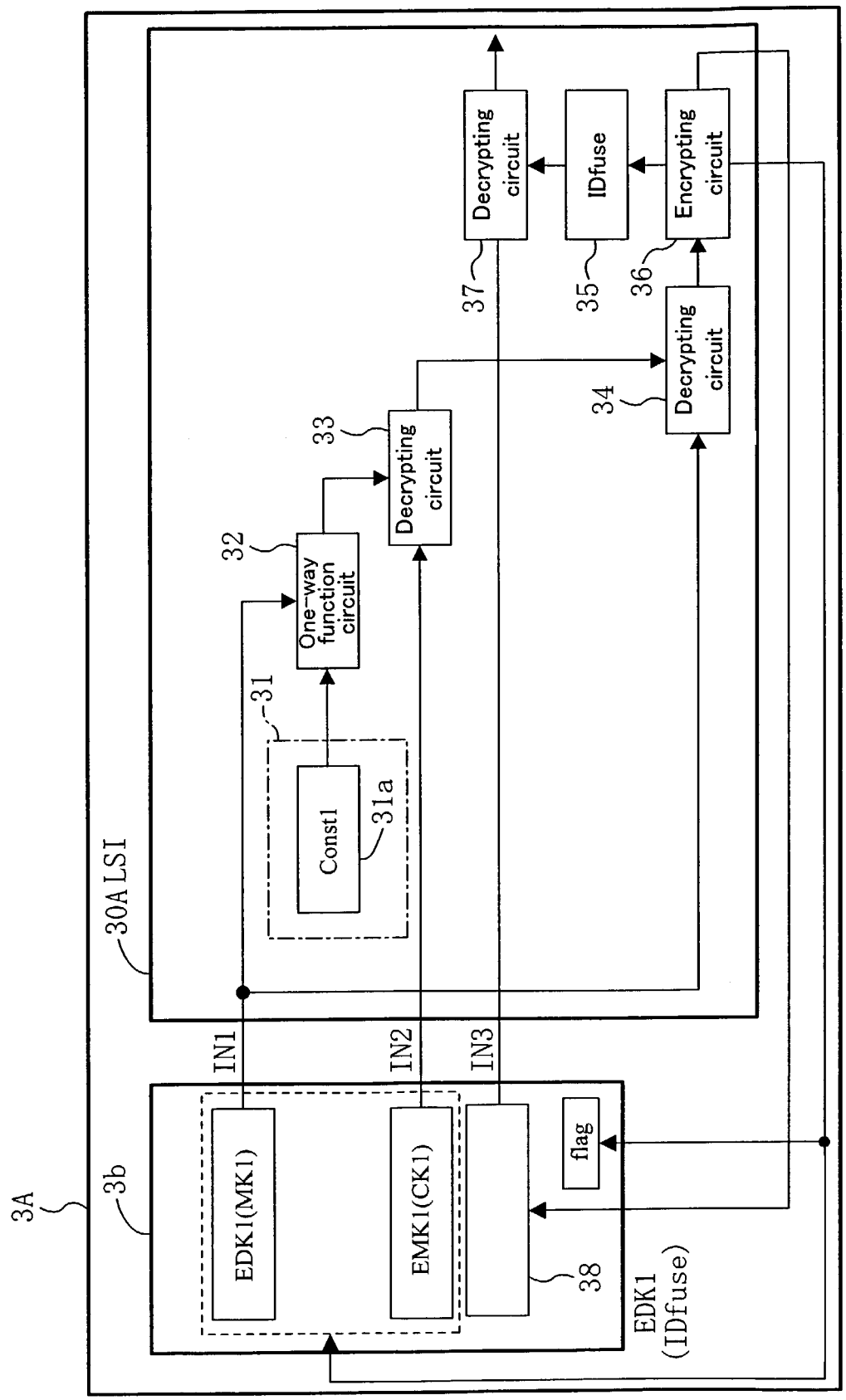
FIG. 18 is a block diagram of a key installation system of the ninth embodiment of the present invention.

FIG. 18 is a block diagram of a key installation system of the ninth embodiment of the present invention. In FIG. 18, the same components as those in FIG. 6 are denoted by the same reference numerals. The key installation system 3A of this embodiment includes a storage section 3b and an LSI 30A. The storage section 3b, as the storage section 3a shown in FIG. 6, stores the first encrypted key EDK1(MK1) obtained by encrypting the final secret key DK1 using the internal key MK1 and the second encrypted key EMK1 (CK1) obtained by encrypting the internal key MK1 using the converted key CK1 obtained by conversion with a one-way function. In addition, the storage section 3b includes: a spare region 38 for storing a third encrypted key to be input from the LSI 30A; and a flag configured to be switchable between the enable state and the disable state. The LSI 30A includes, in addition to the components of the LSI 30 shown in FIG. 6: a fuse circuit 35 capable of implementing an arbitrary constant IDfuse; an encrypting circuit 36 for encrypting the output of the second decrypting circuit 34 using the constant IDfuse fuse-implemented by the fuse circuit 35; and a third decrypting circuit 37 for decrypting the third input IN3 from the storage section 3b using the constant IDfuse fuse-implemented by the fuse circuit 35. The fuse circuit 35 is configured to implement a constant unique to the individual LSI 30A by fuse cutting with laser trimming or the like. The output of the encrypting circuit 36 is supplied to the storage section 3b as the third encrypted key EDK1(IDfuse).

When receiving the third encrypted key EDK1(IDfuse) from the LSI 30A, the storage section 3b stores the third encrypted key EDK1(IDfuse) in the spare region 38, and also deletes the first and second encrypted keys EDK1 (MK1) and EMK1(CK1). The storage section 3b then outputs the third encrypted key EDK1(IDfuse) to the LSI 30A as the third input IN3. The flag is put in the enable state when the storage section 3b is installed in the system 3A, but turned to the disable state when the first and second encrypted keys EDK1(MK1) and EMK1(CK1) are deleted.

Once the LSI 30A is installed in the system 3A, the first encrypted key EDK1(MK1) is input into the LSI 30A as the first input IN1. The one-way function circuit 32 converts the conversion seed Const1 output from the seed generator 31 with a one-way function using the first input IN1, that is, the first encrypted key EDK1(MK1). As a result, the converted key CK1 is generated and output from the one-way function circuit 32.

The first decrypting circuit 33 decrypts the second input IN2, that is, the second encrypted key EMK1(CK1) using the output of the one-way function circuit 32, that is, the converted key CK1 as the key. As a result, the internal key MK1 is generated and output from the first decrypting circuit 33. The second decrypting circuit 34 decrypts the first input IN1, that is, the first encrypted key EDK1(MK1) using the output of the first decrypting circuit 33, that is, the internal key MK1 as the key. As a result, the final secret key DK1 is generated and output from the second decrypting circuit 34.

The final secret key DK1 is supplied to the encrypting circuit 36, which encrypts the final secret key DK1 using the arbitrary constant IDfuse implemented by the fuse circuit 35, to generate the third encrypted key EDK1(IDfuse). The generated third encrypted key EDK1(IDfuse) is written in the storage section 3b.

With the writing of the third encrypted key EDK1(IDfuse), the first and second encrypted keys EDK1(MK1) and EMK1(CK1) are deleted from the storage section 3b, and with this deletion, the flag is turned to the disable state. The processing described hitherto is executed at the factory, so that the system is shipped in the state that the storage section 3b stores only the third encrypted key EDK1(IDfuse) obtained by encrypting the final secret key DK1 using the constant IDfuse unique to the individual LSI 30A. It is needless to mention that the above processing may be executed when the system is first booted up after shipment. While the flag is in the disable state, the third encrypted key EDK1(IDfuse) is supplied from the storage section 3b to the LSI 30A as the third input IN3. The third decrypting circuit 37 decrypts the third encrypted key EDK1(IDfuse) using the constant IDfuse as the key, to generate the final secret key DK1.

As described above, in this embodiment, encryption of the final secret key is easy even when the constant used for encryption is unique to an individual LSI. This improves the confidentiality.

For generation of the keys, the procedure shown in FIG. 7 may be followed as in the third embodiment.

(Tenth Embodiment)

Figure 19:
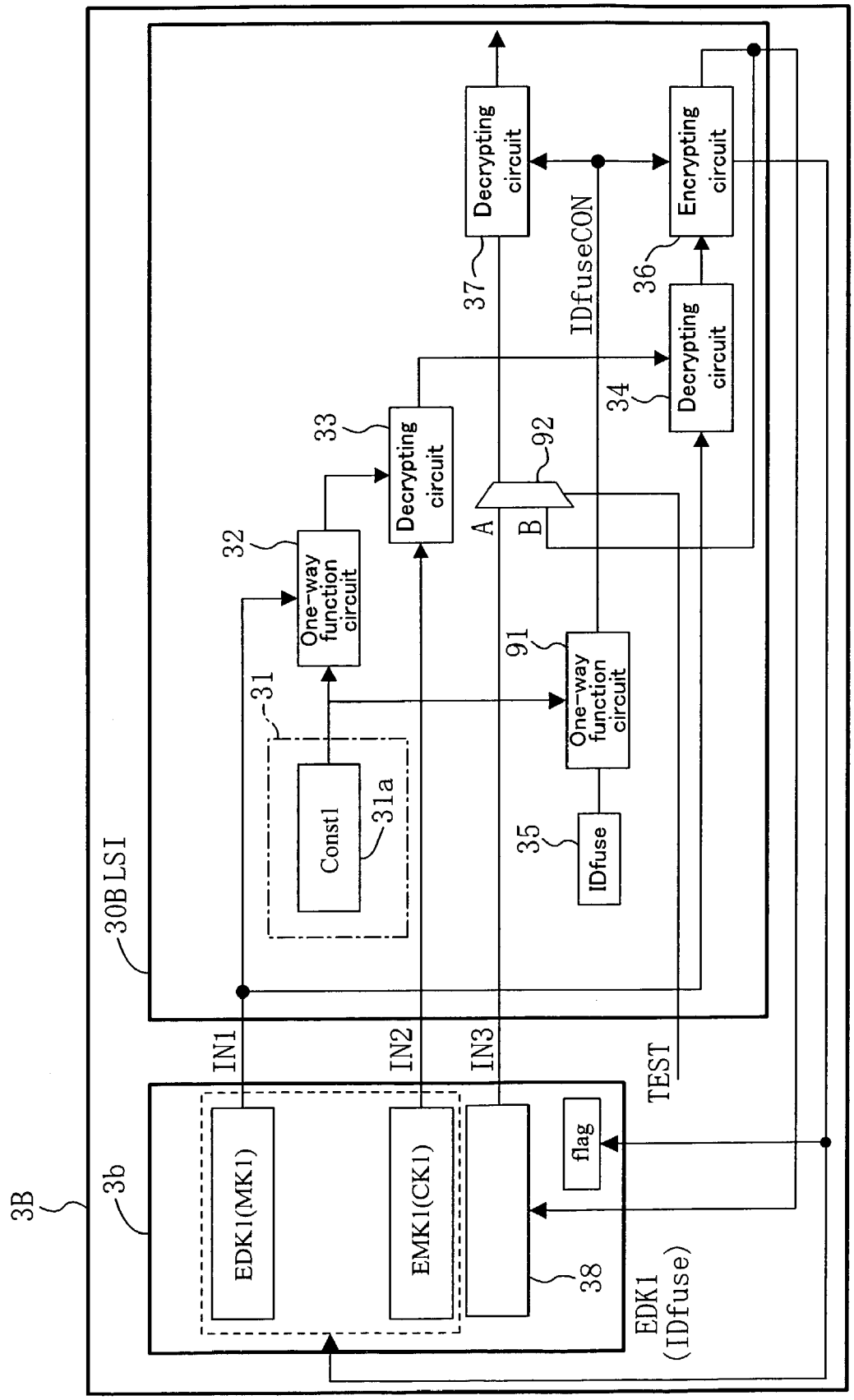
FIG. 19 is a block diagram of a key installation system of the tenth embodiment of the present invention.

FIG. 19 is a block diagram of a key installation system of the tenth embodiment of the present invention. In FIG. 19, the same components as those in FIG. 18 are denoted by the same reference numerals. The key installation system 3B of this embodiment includes the storage section 3b and an LSI 30B.

The LSI 30B includes a second one-way function circuit 91 and a selector 92, in addition to the components of the LSI 30A shown in FIG. 18. The second one-way function circuit 91 converts the constant IDfuse implemented by the fuse circuit 35 with a one-way function using the conversion seed Const1 output from the seed generator 31, to generate a second conversion seed IDfuseCON. The encrypting circuit 36 and the third decrypting circuit 37 use the second conversion seed IDfuseCON, in place of the constant IDfuse, as the key for encryption or decryption. The selector 92 selects and outputs either one of the third input IN3 from the storage section 3b and the output of the encrypting circuit 36 according to the test signal TEST. The third decrypting circuit 37 receives the output of the selector 92 as the input.

First, the operation of the real system will be described. In the real system, the test signal is set at "1".

In this case, substantially the same operation as that described in the ninth embodiment is performed until the final secret key DK1 is output from the second decrypting circuit 34. The encrypting circuit 36 encrypts the output of the second decrypting circuit 34, that is, the final secret key DK1 using the output of the one-way function circuit 91, that is, the second conversion seed IDfuseCON as the key, to generate the third encrypted key EDK1(IDfuseCON).

The third encrypted key EDK1(IDfuseCON) output from the LSI 30B is stored in the spare region 38 of the storage section 3b, and then supplied to the LSI 30B as the third input IN3. The selector 92 selects and outputs the third input, that is, the third encrypted key EDK1(IDfuseCON) output from the storage section 3b in response to the test signal TEST of "1". The third decrypting circuit 37 decrypts the output of the selector 92, that is, the third encrypted key EDK1(IDfuseCON) using the second conversion seed IDfuseCON as the key, to generate the final secret key DK1.

During testing of the LSI 30B, the test signal is set at "0". By substantially the same operation as that during normal working described above, the third encrypted key EDK1 (IDfuseCON) is generated by the encrypting circuit 36, Receiving the test signal TEST of "0", the selector 92 selects and outputs the input B, that is, the third encrypted key EDK1(IDfuseCON) output from the encrypting circuit 36. The third decrypting circuit 37 decrypts the third encrypted key EDK1(IDfuseCON) using the second conversion seed IDfuseCON as the key, to generate the final secret key DK1.

As described above, in this embodiment, testing of LSIs installing individual unique keys can be performed without the necessity of changing the test pattern.

For generation of the keys, the procedure shown in FIG. 7 may be followed as in the third embodiment.

In this embodiment, the selector 92 may be omitted. On the contrary, the selector 92 may be provided in the system of the ninth embodiment shown in FIG. 18.

In the ninth and tenth embodiments, the seed generator may be of another configuration, such as that shown in FIGS. 8, 10, 12, 14 or 16, for example.

As described above, according to the present invention, the key in the LSI and the key in the system are encrypted so that they are mutually related, to thereby make analysis of the keys difficult without knowledge of the mutual relationship between the keys and the encryption scheme. This makes analysis of the keys difficult in the system and thus greatly improves the confidentiality and concealment. In addition, the LSI developer and the system developer can work on their development using only the encrypted keys, and this improves the confidentiality during development. Moreover, keys for encryption can be easily changed, and thus keys unique to individual systems can be easily provided. This further improves the confidentiality.

What is claimed is:

1. A key installation system comprising a storage section and an LSI,
   wherein the storage section stores:
     a first encrypted key obtained by encrypting a final secret key using a first internal key; and
     a second encrypted key obtained by encrypting a second internal key using the first encrypted key, and
   the LSI stores a third encrypted key obtained by encrypting the first internal key using the second internal key, and receives the first and second encrypted keys from the storage section, the LSI comprising:
     a first decrypting circuit for decrypting the input second encrypted key using the input first encrypted key as key to output a key which is equivalent to the second internal key;
     a second decrypting circuit for decrypting the third encrypted key using the output of the first decrypting circuit as key to output a key which is equivalent to the first internal key; and
     a third decrypting circuit for decrypting the input first encrypted key using the output of the second decrypting circuit as key to generate a key which is equivalent to the final secret key.

2. The system of claim 1, wherein the LSI further stores a fourth encrypted key obtained by encrypting a first test internal key using a second test internal key, the LSI further comprising:
     a first selector receiving the third and fourth encrypted keys as inputs for selecting and outputting either one of the inputs according to a first test signal; and
     a second selector receiving the output of the first selector and the output of the second decrypting circuit as inputs for selecting and outputting either one of the inputs according to a second test signal,
     the second decrypting circuit receives the output of the first selector as input in place of the third encrypted key, and
     the third decrypting circuit receives the output of the second selector as key in place of the output of the second decrypting circuit.

3. A key installation system comprising a storage section and an LSI,
   wherein the storage section stores:
     a first encrypted key obtained by encrypting a final secret key using an internal key; and
     a second encrypted key obtained by encrypting the internal key using a converted key obtained by conversion with a one-way function, and
   the LSI receives the first and second encrypted keys, the LSI comprising:
     a seed generator for generating a conversion seed as the source of generation of the converted key;
     a one-way function circuit for converting the conversion seed output from the seed generator with the one-way function using the input first encrypted key, to output a key which is equivalent to the converted key;
     a first decrypting circuit for decrypting the input second encrypted key using the output of the one-way function circuit as key to output a key which is equivalent to the internal key; and
     a second decrypting circuit for decrypting the input first encrypted key using the output of the first decrypting circuit as key to generate a key which is equivalent to the final secret key.

4. The system of claim 3, wherein the seed generator stores the conversion seed.

5. The system of claim 3, wherein the storage section further stores a first constant,
     the LSI further receives the first constant, in addition to the first and second encrypted keys, from the storage section, and
     the seed generator comprises:
       a constant storage for storing a second constant; and
       a second one-way function circuit for converting the second constant with a one-way function using the input first constant, to generate the conversion seed.

6. The system of claim 3, wherein the storage section further stores a third encrypted key obtained by encrypting a first constant using the first encrypted key,
     the LSI further receives the third encrypted key, in addition to the first and second encrypted keys, from the storage section, the seed generator comprises:
a third decrypting circuit for decrypting the input third encrypted key using the input first encrypted key;
a constant storage for storing a fourth encrypted key obtained by encrypting the conversion seed using the first constant; and
a fourth decrypting circuit for decrypting the fourth encrypted key using the output of the third decrypting circuit as key, to generate the conversion seed.

7. The system of claim 3, wherein the storage section further stores a third encrypted key obtained by encrypting the internal key using a test converted key obtained by conversion with the one-way function,
the LSI further receives tile third encrypted key, in addition to the first and second encrypted keys, from the storage section, the LSI further comprising:
a first selector receiving the input second and third encrypted keys as inputs for selecting and outputting either one of the inputs according to a test signal,
the first decrypting circuit receives the output of the first selector in place of the second encrypted key, and
the seed generator is allowed to select and output either one of the conversion seed and a test conversion seed as the source of generation of the test converted key according to the test signal.

8. The system of claim 7, wherein the seed generator comprises:
a constant storage for storing the conversion seed and the test conversion seed; and
a second selector receiving the conversion seed and the test conversion seed as inputs for selecting and outputting either one of the inputs according to the test signal.

9. The system of claim 7, wherein the seed generator comprises:
a first constant storage for storing a first constant as the source of the conversion seed and a second constant as the source of the test conversion seed;
a second selector receiving the first and second constants as inputs for selecting and outputting either one of the inputs according to the test signal;
a second constant storage for storing a third constant; and
a second one-way function circuit for converting the third constant with a one-way function using the output of the second selector.

10. The system of claim 7, wherein the seed generator comprises:
a first constant storage for storing a fourth encrypted key obtained by encrypting a first constant as the source of the conversion seed using the first encrypted key, and a fifth encrypted key obtained by encrypting a second constant as the source of the test conversion seed using the first encrypted key;
a second selector receiving the fourth and fifth encrypted keys as inputs for selecting and outputting either one of the inputs according to the test signal;
a third decrypting circuit for decrypting the output of the second selector using the first encrypted key input into the LSI as key;
a second constant storage for storing a third constant; and
a second one-way function circuit for converting the third constant with a one-way function using the output of the third decrypting circuit.

11. The system of claim 8, wherein the LSI further comprises a verification circuit for verifying the output of the second selector.

12. The system of claim 3, wherein the LSI further comprises:
a fuse circuit capable of implementing an arbitrary constant;
an encrypting circuit for encrypting the output of the second decrypting circuit using the constant implemented by the fuse circuit and outputting the encrypted result to the storage section as a third encrypted key; and
a third decrypting circuit for decrypting the third encrypted key received from the storage section using the constant implemented by the fuse circuit, and
the storage section deletes the first and second encrypted keys and stores the third encrypted key when the storage section receives the third encrypted key from the LSI, and outputs the third encrypted key to the LSI.

13. The system of claim 3, wherein the LSI further comprises:
a fuse circuit capable of implementing an arbitrary constant;
a second one-way function circuit for converting the constant implemented by the fuse circuit with a one-way function using the conversion seed output from the seed generator;
an encrypting circuit for encrypting the output of the second decrypting circuit using the output of the second one-way function circuit and outputting the encrypted result to the storage section as a third encrypted key; and
a third decrypting circuit for decrypting the third encrypted key received from the storage section using the output of the second one-way function circuit, and
the storage section deletes the first and second encrypted keys and stores the third encrypted key when the storage section receives the third encrypted key from the LSI, and outputs the third encrypted key to the LSI.

14. The system of claim 13, wherein the LSI further includes a selector receiving the third encrypted key from the storage section and the output of the encrypting circuit as inputs for selecting and outputting either one of the inputs according to a test signal, and
the third decrypting circuit receives the output of the selector in place of the third encrypted key received from the storage section.

15. The system of claim 9, wherein the LSI further comprises a verification circuit for verifying the output of the second selector.

16. The system of claim 10, wherein the LSI further comprises a verification circuit for verifying the output of the second selector.

17. An LSI for implementing a key installation system, configured to be able to generate a final secret key when the LSI receives a first encrypted key obtained by encrypting the final secret key using a first internal key as a first input and a second encrypted key obtained by encrypting a second internal key using the first encrypted key as a second input, the LSI comprising:
a storage for storing a third encrypted key obtained by encrypting the first internal key using the second internal key;
a first decrypting circuit for decrypting the second input using the first input as key to output a key which is equivalent to the second internal key;
a second decrypting circuit for decrypting the third encrypted key using the output of the first decrypting circuit as key to output a key which is equivalent to the first internal key; and a third decrypting circuit for decrypting the first input using the output of the second decrypting circuit as key to generate a key which is equivalent to the final secret key.

18. An LSI for implementing a key installation system, configured to be able to generate a final secret key when the LSI receives a first encrypted key obtained by encrypting the final secret key using an internal key as a first input and a second encrypted key obtained by encrypting the internal key using a converted key obtained by conversion with a one-way function as a second input the LSI comprising:

a seed generator for generating a conversion seed as the source of generation of the converted key;

a one-way function circuit for converting the conversion seed output from the seed generator with the one-way function using the first input, to output a key which is equivalent to the converted key;

a first decrypting circuit for decrypting the second input using the output of the one-way function circuit as key to output a key which is equivalent to the internal key; and a second decrypting circuit for decrypting the first input using the output of the first decrypting circuit as key to generate a key which is equivalent to the final secret key.

19. The LSI of claim 18, further comprising:

a fuse circuit capable of implementing an arbitrary constant;

an encrypting circuit for encrypting the output of the second decrypting circuit using the constant implemented by the fuse circuit and outputting the encrypted result outside the LSI as a third encrypted key; and a third decrypting circuit for decrypting a third input into the LSI using the constant implemented by the fuse circuit.

20. The LSI of claim 16, further comprising:

a fuse circuit capable of implementing an arbitrary constant;

a second one-way function circuit for convening the constant implemented by the fuse circuit with a one-way function using the conversion seed output from the seed generator;

an encrypting circuit for encrypting the output of the second decrypting circuit using the output of the second one-way function circuit and outputting the encrypted result outside the LSI as a third encrypted key; and a third decrypting circuit for decrypting a third input using the output of the second one-way function circuit.

21. A method for installing a key in a system, comprising the steps of:

storing a first encrypted key obtained by encrypting a final secret key using a first internal key, and a second encrypted key obtained by encrypting a second internal key using the first encrypted key, in a storage section of the system; and installing an LSI in the system, wherein the LSI stores a third encrypted key obtained by encrypting the first internal key using the second internal key, and receives the first and second encrypted keys from the storage section, the LSI comprising:

a first decrypting circuit for decrypting the input second encrypted key using the input first encrypted key as key to output a key which is equivalent to the second internal key;

a second decrypting circuit for decrypting the third encrypted key using the output of the first decrypting circuit as key to output a key which is equivalent to the first internal key; and a third decrypting circuit for decrypting the input first encrypted key using the output of the second decrypting circuit as key to generate a key which is equivalent to the final secret key.

22. A method for installing a key in a system, comprising the steps of:

storing a first encrypted key obtained by encrypting a final secret key using an internal key, and a second encrypted key obtained by encrypting the internal key using a converted key obtained by conversion with a one-way function, in a storage section of the system; and installing an LSI in the system, wherein the LSI receives die first and second encrypted keys, the LSI comprising: a seed generator for generating a conversion seed as the source of generation of the converted key;

a one-way function circuit for converting the conversion seed output from the seed generator with the one-way function using the input first encrypted key, to output a key which is equivalent to the converted key;

a first decrypting circuit for decrypting the input second encrypted key using the output of the one-way function circuit as key to output a key which is equivalent to the internal key; and a second decrypting circuit for decrypting the input first encrypted key using the output of the first decrypting circuit as key to generate a key which is equivalent to the final secret key.

* * * * *